May 3, 1960 A. H. DICKINSON 2,935,251

DATA STORAGE APPARATUS

Filed Nov. 1, 1954 9 Sheets-Sheet 1

INVENTOR.
ARTHUR H. DICKINSON

BY P. E. Henninger

ATTORNEY

INVENTOR.
ARTHUR H. DICKINSON

BY P. E. Henninger

ATTORNEY

May 3, 1960 A. H. DICKINSON 2,935,251

DATA STORAGE APPARATUS

Filed Nov. 1, 1954 9 Sheets-Sheet 3

INVENTOR
ARTHUR H. DICKINSON

BY P. E. Henninger
ATTORNEY

May 3, 1960 A. H. DICKINSON 2,935,251

DATA STORAGE APPARATUS

Filed Nov. 1, 1954 9 Sheets-Sheet 4

INVENTOR.
ARTHUR H. DICKINSON

BY P. E. Henninger

ATTORNEY

INVENTOR.
ARTHUR H. DICKINSON
BY P. E. Henninger
ATTORNEY

INVENTOR.
ARTHUR H. DICKINSON
BY P. E. Henninger
ATTORNEY

DATA STORAGE APPARATUS

Filed Nov. 1, 1954 9 Sheets-Sheet 7

INVENTOR.
ARTHUR H. DICKINSON

BY P. E. Henninger

ATTORNEY

DATA STORAGE APPARATUS

INVENTOR.
ARTHUR H. DICKINSON
BY P.E. Henninger
ATTORNEY

INVENTOR.
ARTHUR H. DICKINSON
BY P. E. Henninger
ATTORNEY 2,935,251
Patented May 3, 1960

2,935,251

DATA STORAGE APPARATUS

Arthur H. Dickinson, Greenwich, Conn., assignor to International Business Machines Corporation, New York, N.Y., a corporation of New York Application November 1, 1954, Serial No. 465,913

28 Claims. (Cl. 235—61.6)

This invention relates to data storage apparatus, and more particularly to a data storage device into which the data may be read from one or more record sources, and from which such stored data may be read out to a data reproducer or other data utilizing mechanism. In connection with this data storage device, there are employed novel read-in apparatus and circuits and novel read-out apparatus and circuits.

The invention is illustrated herein as applied to a record controlled accounting machine of the type utilizing perforated cards as records. In order to provide a specific example of such a machine, the invention is described herein as applied to a Type 405 IBM Alphabetical Accounting Machine. Such a machine is disclosed sufficiently completely for the purposes of illustrating the background of the present invention in the United States patent to Rubidge et al., No. 2,340,772, entitled Accumulating Means. It should be readily understood that the invention is applicable to other punched card machines, and many features of the invention are in fact broadly applicable to any apparatus requiring data storage.

An object of the invention is to provide an improved mechanical data storage device.

Another object is to provide a device of the type described which is adaptable for use with record controlled accounting machines.

Another object is to provide improved apparatus of the type described, including improved means for checking the stored data with the data supplied by the original record, in order to guard against machine errors.

Another object of the invention is to provide a data storage device which is more compact than prior mechanical storage devices, and which includes, for a given space, more localities or storage addresses where individual items may be stored.

Another object is to provide improved means for selecting a particular one among a plurality of storage localities or addresses.

Another object of the invention is to provide improved data transfer means for use with the improved storage device, including reading-in mechanism, reading-out mechanism, field transfer mechanism, and reset mechanism.

The foregoing and other objects of the invention are attained in the apparatus described herein by providing a cylindrical drum which is rotated continuously about its axis. The periphery of the drum carries a plurality of rows of metallic pins, which are movable radially between first and second data indicating positions, and which are retained frictionally in either of these positions. Reading-in mechanism is provided including means for radially displacing the pins between their two positions while the drum is rotating.

Each of the pins is formed in part of magnetic material, and the positions of the pins are sensed for reading-out purposes by electric potentials generated in adjacent pick-up coils by the passage of the magnetic portion of the pins as the drum rotates. This magnetic sensing of the pin positions is also utilized to check the pin positions against the reading-in mechanism, in order to detect errors.

Record controlled machines of the type referred to above are commonly driven repeatedly through a fixed cycle, called a machine cycle, in which certain events such as the reading of a card and the performance of accounting functions indicated by the card follow one another in a predetermined sequence. Events occurring during a machine cycle are commonly timed with reference to the angular position of a shaft, known as the machine cycle index shaft, which rotates one revolution during each machine cycle. The data storage device of the present invention is adaptable for coordination with such a machine cycle and with such a sequence. The drum is driven by the same motor which drives the machine, and at a rate which is a fixed multiple of the machine cycle speed. In other words, the drum rotates a plurality of revolutions during each machine cycle.

Data may be transferred to or from the drum only at a fixed number of times during the machine cycle, which times correspond to a predetermined plurality of angular positions of the drum with respect to a fixed datum. Each row of pins of the drum is provided with a plurality of storage phases, each phase consisting of a plurality of pins, corresponding in number and spacing to the data transfer positions of the drum. The particular phase which is to be read-in or read-out on any given machine cycle is selected by shifting the angular position of the drum with respect to the machine cycle index shaft. This phase shifting is accomplished by means of a differential gear having two input shafts and a single output shaft connected to the drum. One of the two input shafts is continuously driven synchronously with the machine cycle index shaft and the other is driven through a clutch which is controlled in order to produce any phase shift which may be required.

Record controlled machines of the type referred to commonly have their numerical data recorded according to a decimal pattern. In order to reduce the number of pins required for data storage on the drum of the present invention, it is preferred to record information thereon in accordance with a bi-quinary code, such that only five pins are required to store any decimal digit. The reading-in and reading-out apparatus described herein includes mechanism for translating an incoming decimal quantity into the bi-quinary code and for translating an outgoing bi-quinary quantity into the decimal system, if the latter is required by the data receiving apparatus.

Other objects and advantages of the invention will become apparent from a consideration of the following specification and claims, taken together with the accompanying drawings.

Figures 1, 3:
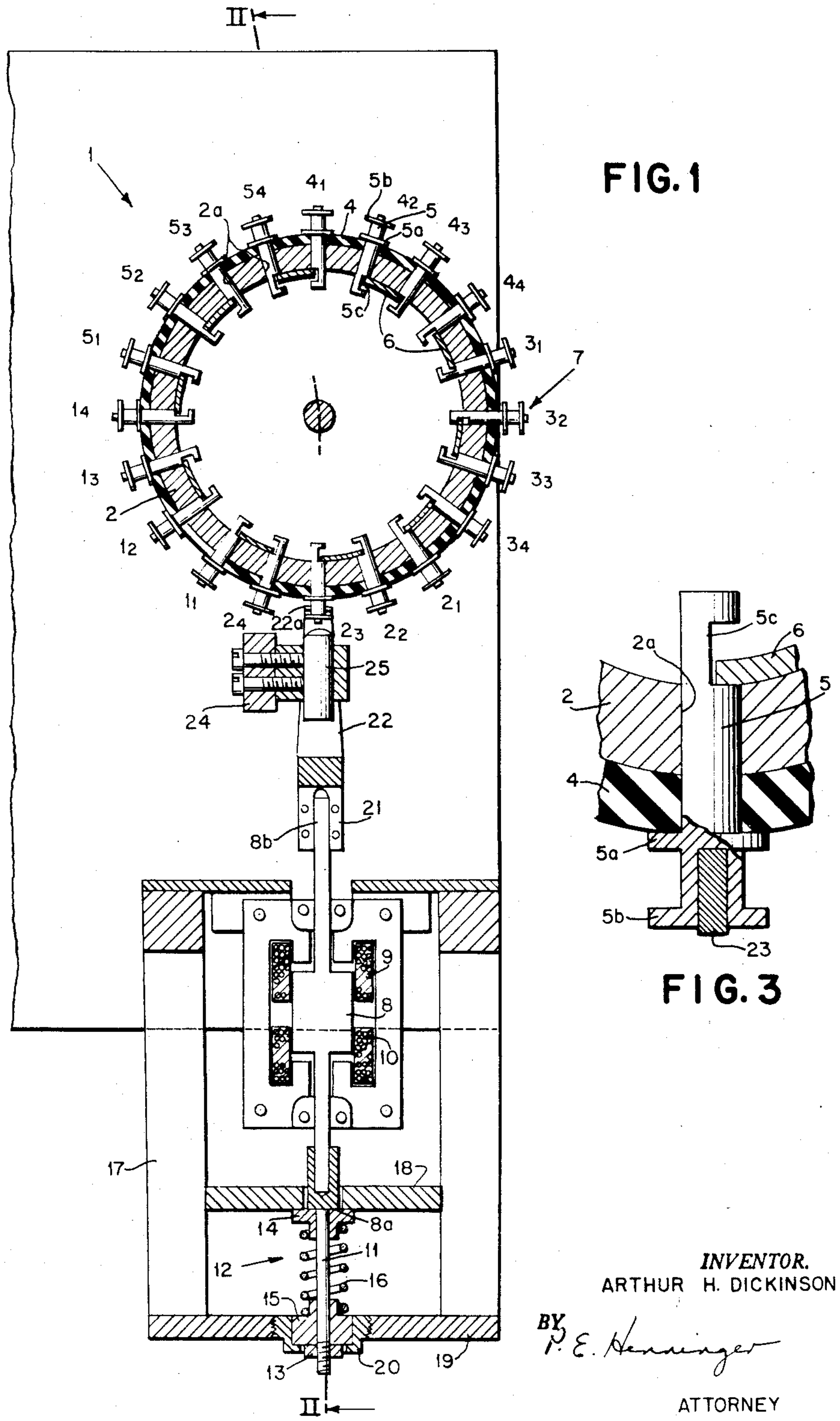
Fig. 1 is a cross-sectional view taken on the line I—I of Fig. 2, looking in the direction of the arrows, showing a data storage drum and read-in and read-out mechanism for the drum.
Fig. 3 is a fragmentary view, on a section similar to Fig. 1 and in an enlarged scale, showing in detail the structure of one of the pins.
Figure 2:
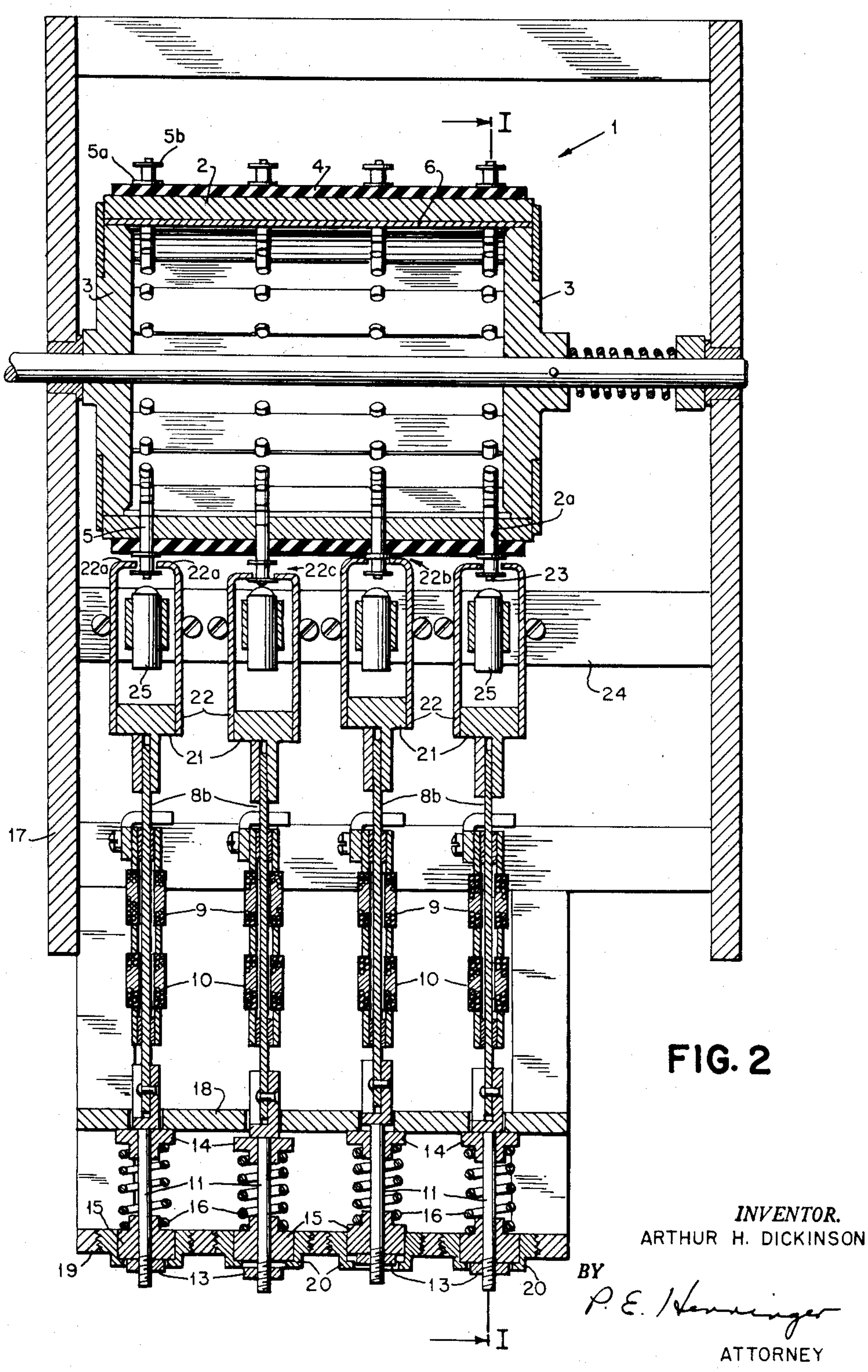
Fig. 2 is a cross-sectional view taken on the line II—II of Fig. 1.

*Figs. 1 to 3—Storage drum*

The data storage device which comprises the central feature of the present invention is illustrated in these figures. There is shown a cylindrical drum generally indicated by the reference numeral 1, and comprising a cylinder or plate member 2 and end plates 3 closing the ends of the cylinder. The cylinder 2 and end plates 3 may be of metal, for example aluminum. Concentric with and outside the cylinder 2 there is provided another cylinder 4, of polyvinyl butyral plastic. The drum 1 is provided with four rows of peripherally spaced holes 2a, twenty in each row. These holes extend through the inner cylinder 2 and are aligned with corresponding holes in the outer plastic cylinder 4. In each hole there is mounted a data storage pin 5. Each of the pins 5 has two collars 5a and 5b on its outer end, and on its inner end is provided on one side with a notch 5c. Each pair of adjacent pins 5 is held against removal from the drum 1 by a retainer strip 6, which extends longitudinally along the inside of the cylinder 2 and through suitable apertures in the end plates 3. Each retainer strip 6 engages the notches 5c on two adjacent pins in each row. The notches 5c are wider than the thickness of the retainer strips, which are effective to limit the radial movements, both inward and outward, of the pins 5.

Each pin 5 is radially movable between an inner or normal position, shown in Fig. 1, and an outer or active position, shown in the case of one of the pins at 7 in Fig. 1. The polyvinyl butyral plastic material is more or less flexible, and has a peculiar characteristic that holes punched therein have inwardly convex surfaces, and grip the pins with a coefficient of friction which is effective to hold the pins in either of their two radial positions against centrifugal forces and against gravity, but still low enough so that the pins may be readily moved against that frictional resistance by the mechanism described immediately below. This phenomenon is more completely described in the patent to James W. Bryce and John N. Wheeler, No. 2,521,338, dated September 5, 1950, entitled Reading Apparatus.

The pin moving mechanism includes an armature 8, having a normal position midway between two coils 9 and 10. A lower extension of the armature 8 includes a projecting rod 11, which is joined to the armature 8 at a shoulder 8a. A spring centering mechanism generally indicated by the reference numeral 12 is mounted on the rod 11 between the shoulder 8a and a nut 13 threaded on the lower end of the rod 11. The spring centering mechanism 12 comprises two washers 14 and 15, slidable on the rod 11, and a coil spring 16 retained between the washers and biasing them apart. The downward movement of washer 15 with respect to rod 11 is limited by the nut 13 and the upward movement of washer 14 with respect to the rod 11 is limited by shoulder 8a. The pin positioning mechanism is supported on a frame 17 having a cross member 18 apertured to permit passage of the lower end of armature 8, and an end member 19 having a central aperture closed by an apertured threaded cap member 20. The washers 14 and 15 on the rod 11 extend laterally so that the washer 14 engages the cross member 18 of the frame and the washer 15 engages the cap member 20. The downward movement of washer 15 with respect to frame 17 is limited by cap 20 and the upward movement of washer 14 with respect to frame 17 is limited by cross member 18. The vertical spacing between the upper face of the inside of cap member 20 and the lower face of cross member 18 is equal to the vertical spacing between nut 13 and shoulder 8a. The spring 16 is effective to hold the armature 8 in a position such that shoulder 8a is aligned with the lower surface of the cross member 18 and the nut 13 is aligned with the inner end surface of the cap member 20. This is the normal or central position of the pin positioning mechanism. By adjusting the position of cap member 20 and nut 13, the tension of spring 16 can be adjusted without affecting the normal position of armature 8.

The upper end of armature 8 is provided with an extension 8b, on which is fixed a T-member 21 supporting a pair of upwardly extending fingers 22 having their tips bent over as shown at 22a so that they extend between the flanges 5a and 5b on the pins 5. The distance between the flanges 5a and 5b is somewhat greater than the sum of the thickness of the tips 22a and the travel of the pins between their inner and outer positions. Consequently, the finger tips 22a, when the pin positioning mechanism is in the normal position, do not engage either of the flanges 5a or 5b of any of the pins 5, whether the pins 5 are in their inner or outer positions.

When the coil 9 is energized, armature 8 is moved upwardly from the position shown, carrying with it fingers 22. If one of the pins 5 is at that time between the finger tips 22a, then the tips 22a engage the flange 5a of that pin, moving the pin to the inner position, as shown at 22b in Fig. 2.

When the coil 10 is energized, the armature 8 is drawn downwardly from the position shown. If one of the pins 5 is at that time passing between the finger tips 22a, then they engage the outer flange 5b and pull the pin to its outer position, as shown at 22c in Fig. 2.

Each of the pins 5 is at least partially of magnetic material. In the construction shown, each pin 5 is provided with an insert 23 of magnetic material. Permanently magnetized material, e.g. Alnico, is preferred. Mounted on the frame 17 is a cross bar 24 carrying four pick-up coils 25, one for each of the four rows of pins on the drum 1. These pick-up coils have their upper ends located closely adjacent the paths through which the tips of the pins 5 move. The arrangement is such that when the pins are in their inner positions, substantially no electromotive force is induced in the coils 25 by their passage, whereas when the pins are in their outer positions, a substantial electromotive force is induced. These electromotive forces are used, as described in detail below, as a pin position sensing mechanism and also as a pin position checking mechanism.

Referring now to Fig. 1, it may be seen that the twenty pins of each row are arranged in four phases, referred to herein as the 1, 2, 3 and 4 phases. There are five pins in each phase, which for phase 1, for example, are numbered $1_1$, $2_1$, $3_1$, $4_1$, and $5_1$. Pins of the other phases are correspondingly identified. Each phase constitutes a data storage device for storing one decimal digit. In order to be able to store a decimal digit on five pins, a bi-quinary code is adopted. According to this code, the inner position of each pin is regarded as a binary "0" and the outer position of the pin is regarded as a binary "1". When all the pins of a phase are in their "0" positions, then that phase registers zero. Each pin in its binary "1" position registers a digit of five or less, the consecutive digits being assigned to consecutive pins. To register a digit greater than five, then the five pin and another pin of the same phase are both moved to their outer positions. For example, if a 7 is to be registered in phase 1, then both pins $5_1$ and $2_1$ are moved to their outer positions.

Figures 4, 5:
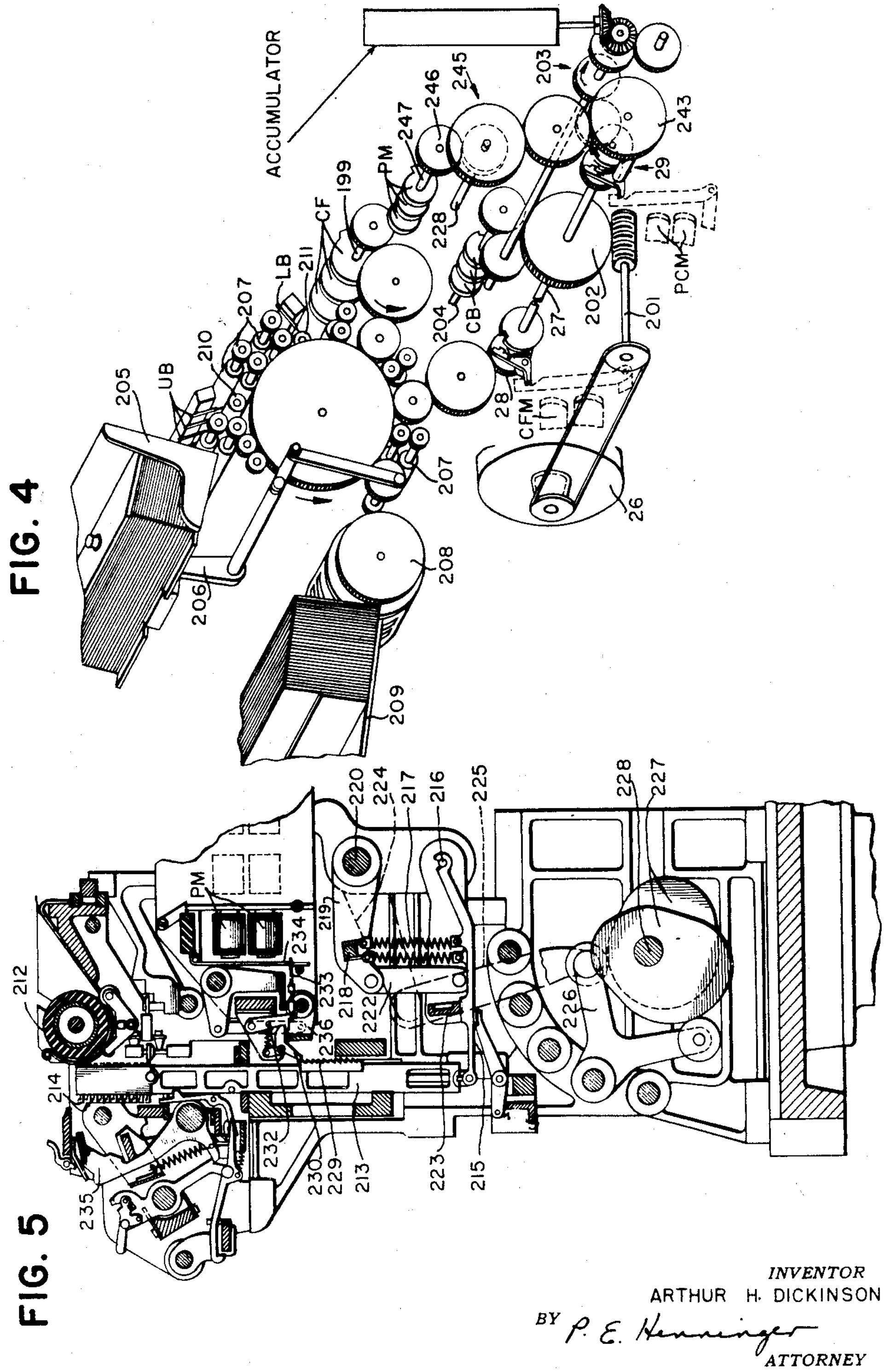
Fig. 4 is a somewhat diagrammatic perspective view of an accounting machine with which the data storage device may be used.
Fig. 5 is a sectional view through the printing mechanism of the machine of Fig. 4.

*Accounting machine—Figs. 4 and 5*

As indicated above, the accounting machine illustrated herein as being utilized in connection with the present invention is of the type disclosed in the patent to Rubidge et al., No. 2,340,772, to which reference may be made for a more complete disclosure of the type of machine contemplated. Not all of the functions for which that accounting machine is designed are utilized herein, and therefore only so much of that machine will be illustrated and described as appears necessary for an understanding of its function in connection with the present invention.

Figs. 4 and 5 herein correspond generally to Figs. 1 and 3, respectively, of the aforesaid Rubidge et al. patent.

In Fig. 4, there is shown a motor 26 connected through a belt drive to a shaft 201 which drives a worm gear 202 and thereby rotates a machine index shaft 27. Shaft 27 is connected through a gear train generally indicated at 203 to a shaft 204 carrying a set of cams CB. The cams CB operate CB switch contacts referred to below.

Punched cards entering the machine are stacked in a supply hopper 205. A picker 206 feeds one card at a time from the bottom of the hopper through a plurality of successive pairs of feed rolls 207. These rolls 207 carry the card continuously through an upper analyzing station and thence through a lower analyzing station. The cards then pass to an ejecting drum 208 which deposits them in a delivery magazine 209.

The upper analyzing station comprises a common contact roller 210 and a row of conductive sensing brushes UB. The lower analyzing station has a similar common contact roller 211 and a similar row of brushes, one of which is shown at LB in Fig. 4. Each brush senses one column on the cards which pass it. If there is a perforation in the column, the brush engages the common contact roller through the perforation.

Each column of the card conventionally has twelve index positions, at any of which positions the card may have a perforation. These positions are commonly termed the 9 to 0, X and R positions.

Figure 6:
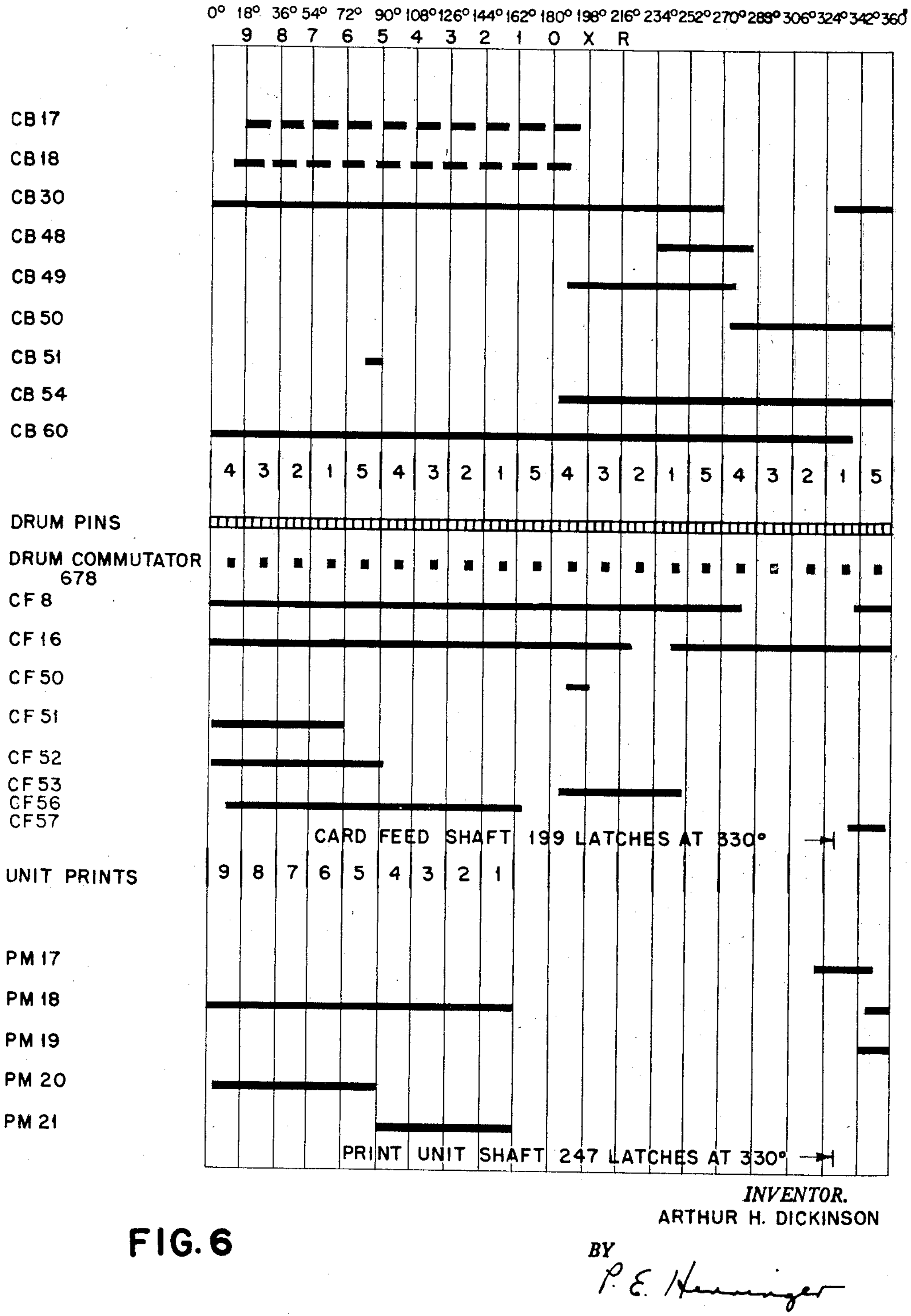
Fig. 6 is an electrical timing chart showing the relationship between the timing of the various cams involved in the described circuits.

The rate of movement of the cards is such that the index positions 9 to 0, X and R pass an analyzing station during the first twelve intervals or index points of a cycle, as indicated in the first line of the timing chart, Fig. 6.

The cards follow each other at a distance and successive cards traverse an analyzing station during successive cycles. The upper and lower analyzing stations are spaced so that corresponding index positions of a pair of successive cards are at the brushes UB and LB simultaneously.

The card feeding apparatus including the picker 206 and the feed rolls 207 are driven from the continuously rotating shaft 27 through a one-revolution clutch generally indicated at 28 and controlled by a clutch magnet CFM. When this magnet is energized, the clutch engages and the card feed mechanism is driven through the next revolution of shaft 27. A shaft 199, carrying cams CF, is also driven through clutch 28 and suitable gearing. The cams CF operate CF switch contacts, referred to in the circuit description below. Energization of the card feed magnet CFM is controlled by a conventional circuit dependent upon various conditions. For example, one of the conditions is that there must be cards in the supply hopper 205 in order for the magnet CFM to be energized. Commonly, these conditions will be satisfied continuously through a long series of successive revolutions of the shaft 27, so that the cards feed successively through the analyzing station. Any machine cycle during which the card feed magnet is energized is referred to as a card feed cycle.

The machine cycle in this particular accounting machine is divided into twenty intervals, each covering 18° of the index shaft rotation. Note that the number of intervals in the cycle is a multiple of the number of pins (i.e. five in the present instance) in one phase of the storage drum 1.

Fig. 5 illustrates the printing mechanism which is conventionally actuated to print data from the cards passing through the accounting machine, and may, in accordance with the present invention, be additionally or alternatively actuated to print data stored on the drum 1.

There is shown in Fig. 5 a platen roller 212 around which the sheet to be printed on is fed. Disposed to the left of the platen 212, as it appears in the drawing, are a plurality of vertically slidable type carriers 213, each carrying transversely slidable type elements 214 normally held by springs (not shown) in retracted positions. The type elements 214 in vertically descending order bear types for printing digits 9 to 0.

Each type carrier 213 is connected at its lower end to an arm 215 pivoted at 216 and connected by a spring 217 to a common bar 218. Bar 218 is fixed between arms 219 fast to a shaft 220. Connected by links 222 to arms 219 is a restoring bail 223 overlying all the arms 215. Shaft 220 rigidly carries an arm 224 connected by a link 225 to a cam follower 226. The cam follower has two branches each engaging one of the complementary cams 227 fast to a cam shaft 228. During a revolution of shaft 228, cams 227 oscillate follower 226. During counterclockwise movement of follower 226, shaft 220 and arms 219 move clockwise. Restoring bar 223 also moves clockwise while springs 217 force the arms 215 to follower, thereby moving the type carriers 213 upwardly.

The type carriers may be individually arrested in differential positions with selected types at printing position. The arresting means includes ratchet teeth 229 provided in each type carrier and spaced similarly to the type elements 214. Arranged to coact with the ratchet teeth of each type carrier is a pawl 230 held by a latch 232 from engaging the ratchet teeth. Latch 232 is connected by a rod 233 to an armature 234 of a print magnet PM. When the magnet is energized, the latch 232 is released from pawl 230 which springs into arresting engagement with a tooth 229 of the type carrier. There is one such arresting means, including a print magnet PM, for each type carrier. A print magnet may be energized under control of perforations in record cards during any of the first ten intervals of a card feed cycle (see Fig. 6). The energization of magnet PM during the first cycle interval arrests the type carrier with the 9 type at printing position; energization of the magnet during the second interval arrests the type carrier with the 8 type at printing position, and so on. When a type carrier is arrested, the associated arm 215 stops, and connected spring 217 stretches, while actuating arms 219 and restoring bail 223 continue to rock clockwise. After the period during which the type carriers may differentially be set in selected printing position, printing hammers 235 are tripped and strike the type elements at printing position to print the selected data, through a suitable ink ribbon, on the sheet carried by the platen 212. After the printing operation, the pawls 230 are restored into engagement with latches 232 by a common bail 236. The operations of the hammers and of bail 236 are described in Patent 2,079,418 and need not be explained further herein.

The printing means is operated only during desired machine cycles, which may be referred to as printing cycles. When the machine is listing, the printing means operates every cycle in which a card is fed as well as in the total cycle. When the machine is set for tabulating the printing means operates during the cycle in which the first card of a group is fed and during a total cycle. The operating means for the printing means comprises a one-revolution clutch 29 (Fig. 4) driven by the continually rotating shaft 27. When engaged, clutch 29 drives a gear 243, rotatably mounted on shaft 27. Clutch 29 is controlled by a print clutch magnet PCM. When this magnet is energized, gear 243 is coupled to shaft 27 for rotation. Gear 243 acts through gear train 245 to rotate the previously mentioned cam shaft 228 which carries the cams 227 (Fig. 5) for operating the parts of the printing means. Gearing 246 connects shaft 228 to a shaft 247 carrying PM cams for operating PM switch contacts referred to in the circuit description.

Figure 7:
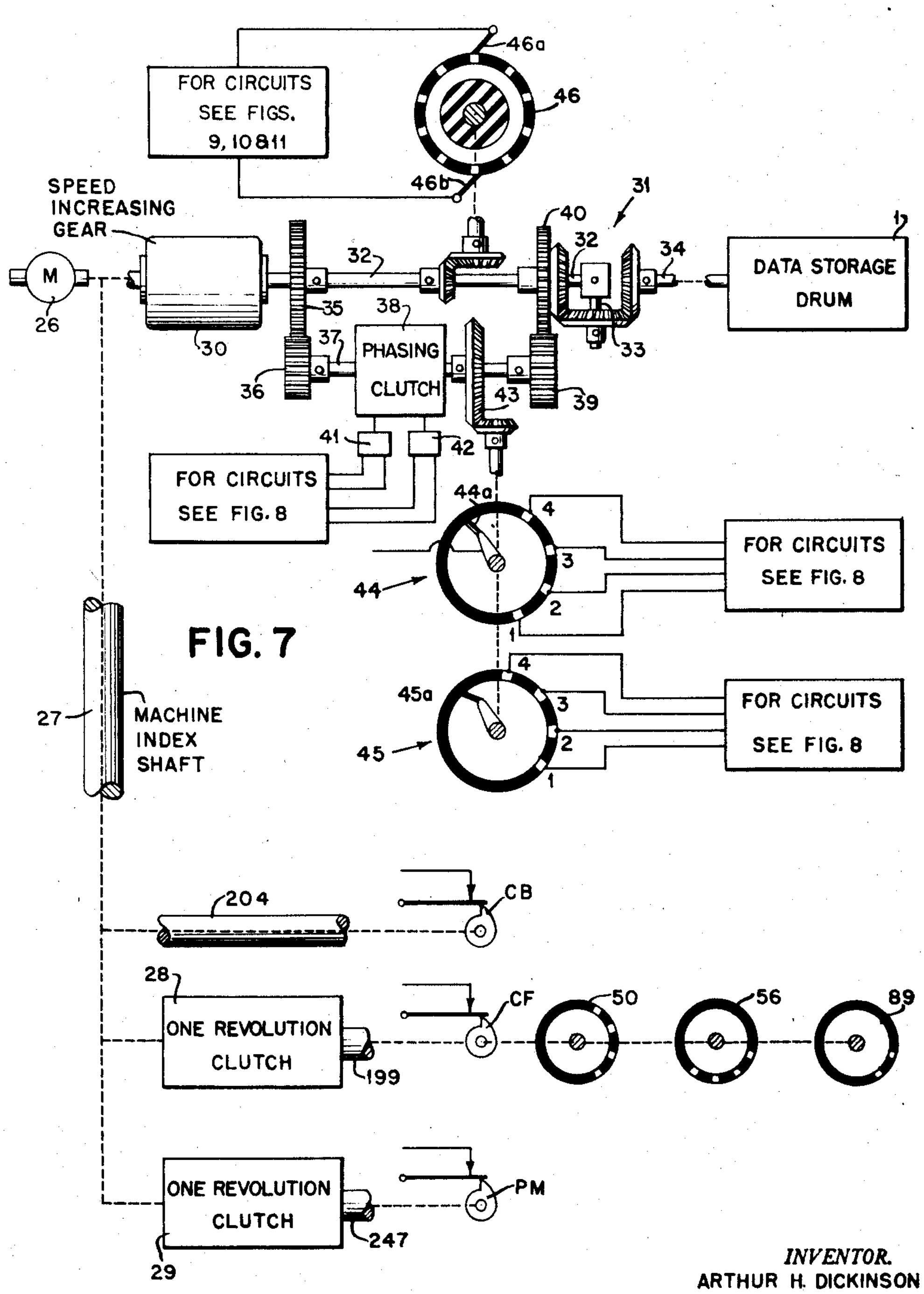
Fig. 7 is a diagrammatic view showing the driving mechanism for the data storage drum of Fig. 1 and for certain other elements of a complete accounting machine.

*Fig. 7—Driving mechanism*

This figure diagrammatically illustrates the driving mechanism for the data storage drum 1 and the other parts of the data storage apparatus, and the relationship of that driving mechanism for the driving mechanism of the conventional parts of the record controlled machine, i.e. the accounting machine of Figs. 4 and 5.

All the parts of the apparatus are driven by a motor schematically indicated at 26, connected through gearing illustrated only diagrammatically in Fig. 7 to a principal shaft 27 of the machine, hereinafter identified as the machine index shaft. This shaft turns through 360° in one machine cycle, and the timing of all the moving parts of the machine is coordinated by reference to the angular position of that shaft at which a particular function occurs. 0° is considered as the start of a machine cycle and 360° as the end of a machine cycle. As stated above, the machine cycle is divided into twenty intervals of 18° each, sometimes referred to as index points. The machine index shaft 27 is continuously running as long as power is supplied to the machine. The shaft 27 drives a shaft 204 carrying a plurality of contact operating cams, one of which is shown diagrammatically in Fig. 7, and which are hereinafter referred to as the CB cams. In the wiring diagrams which appear in Figs. 8 to 11, these cams are indicated diagrammatically, each cam on the CB shaft and its associated contacts being given a reference character beginning with the letters CB. The timing chart in Fig. 6 shows the particular times in each machine cycle when each cam closes its contacts, and hence illustrates the cam contours. No effort is made in the wiring diagrams to illustrate accurately the cam contour used in each instance, a generalized cam outline being used as a diagram for all the cam contours.

The record controlled machine includes a card feeding shaft 199 controlled by a one-revolution clutch mechanism shown in Fig. 4 and diagrammatically indicated at 28 in Fig. 7. When various controlling conditions (e.g. cards in hopper 205, magazine 209 not full) are proper for the feeding of a card into the machine, the one-revolution clutch 28 is engaged, and during the next machine cycle, the shaft 199 turns with the machine index shaft 27. As indicated in Fig. 6, the shaft 199 completes its revolution at the 330° position of the machine index shaft, and remains stationary until the one-revolution clutch is again actuated. It may be, and in fact typically is, actuated immediately so that the shaft 199 operates continuously. However, it often remains stationary for one or more machine cycles. The shaft 199 drives a plurality of cam operated switches identified diagrammatically in the wiring diagrams in Figs. 8 to 11, wherein each of them is assigned a reference character beginning with the letters CF. The cam contour in each case is indicated by the time chart in Fig. 6. Shaft 199 also drives a drum phasing emitter 50, a drum section emitter 56, and a read-out emitter 89, Fig. 7.

One revolution of the CF shaft 199 may be hereinafter referred to as a card feed cycle. In one card feed cycle, any particular card passes one operating station, e.g. a card scanning or sensing station. In the accounting machine illustrated, the cards in the hopper 205 pass through the first reading or analyzing station during one card feed cycle, and through the second reading station during the next card feed cycle.

The machine also includes a PM shaft 247 driven by the motor 26 through a one-revolution clutch 29. The PM shaft is associated with the printing operation, and a cycle of its rotation is initiated when the machine is ready to print.

One revolution of the PM shaft may be hereinafter referred to as a printing cycle. Each printing cycle coincides with a machine cycle and a card feed cycle according to the time chart of Fig. 6, although it will be readily understood that a machine cycle may take place without a concurrent card feed cycle, and that a machine cycle may take place concurrently with a card feed cycle, but without a concurrent printing cycle.

The data storage drum 1 is driven by the motor 26 through a speed increasing gear 30 and a differential gear 31. The speed increasing gear 30 has a two-to-one gear ratio. The speed increasing gear 30 drives a shaft 32 which turns the spider 33 of the differential gear 31 and thereby drives the differential output shaft 34 which in turns drives the data storage drum 1. There is a speed ratio of two-to-one between input shaft 32 and output shaft 34 of the differential, so that the data storage drum 1 normally rotates four times as fast as the machine index shaft 27. A gear 35 fixed on shaft 32 engages a gear 36 on a shaft 37 which drives, through a phasing clutch indicated diagrammatically at 38, a gear 39 engaging an input gear 40 freely rotatable on shaft 32 of the differential gear mechanism 31. The phasing clutch 38 is normally disengaged and gears 39 and 40 are normally stationary. There is a two-to-one ratio between gears 35 and 36, and hence between shafts 32 and 37. Gears 39 and 40 have a one-to-one ratio.

When it is desired to change the phase of the data storage drum 1, i.e. to change its angular position with respect to that of the index shaft 27, the phasing clutch is engaged, whereupon gears 39 and 40 are rotated. The gear 40 is driven with twice the speed as shaft 32, and in the same direction, to counteract the rotation introduced into the gear 34 by the spider 33, so that the output shaft 34 remains stationary as long as both inputs are turning. It may be noted that, if output shaft 34 were driven from gear 40 alone, it would rotate in a direction opposite to that produced by a drive from shaft 32 alone. Hence, by driving gear 40 at twice the speed of shaft 32, shaft 34 may be held stationary.

Alternatively, the gear 40 may be driven so that its rotation adds to that of shaft 32 and spider 33, and the shaft 34 then runs at twice its normal speed. These two alternatives represent optimum arrangements. It is, of course, possible to bring the drum 1 into any desired phase with any selected rotative speed of gear 40, providing only that a sufficient period of time is available to accomplish the phasing. When the data storage drum 1 has attained the desired phase, the phasing clutch 38 is disengaged and the data storage drum 1 resumes its normal speed of rotation.

The phasing clutch 38 is preferably of the type described in detail in United States Patent No. 2,328,653, issued to C. D. Lake et al. on September 7, 1943, and entitled Clutch Means for Accumulating Units. This clutch is actuated by two electromagnets illustrated diagrammatically at 41 and 42. The clutch remains in either its disengaged or engaged position when neither electromagnet is energized. A momentary eenergization of electromagnet 41 causes engagement of the clutch if it was previously disengaged. A momentary energization of electromagnet 42 causes disengagement of the clutch if it was previously engaged.

A gear 43, turning with the gear 39, drives a pair of phasing clutch emitters 44 and 45, each comprising a brush, such as shown at 44*a*, running over a series of stationary contacts corresponding to the four phases 1, 2, 3 and 4.

A commutator 46 is driven from the shaft 32 and runs at the speed of that shaft. It comprises ten electrically connected contact bars which complete a circuit between brushes 46*a* and 46*b* at five equally spaced intervals during each rotation of shaft 32. These intervals correspond to the intervals at which the pins 5 of a given phase on drum 1 come opposite the pin positioning and pin sensing mechanisms.

Figure 8:
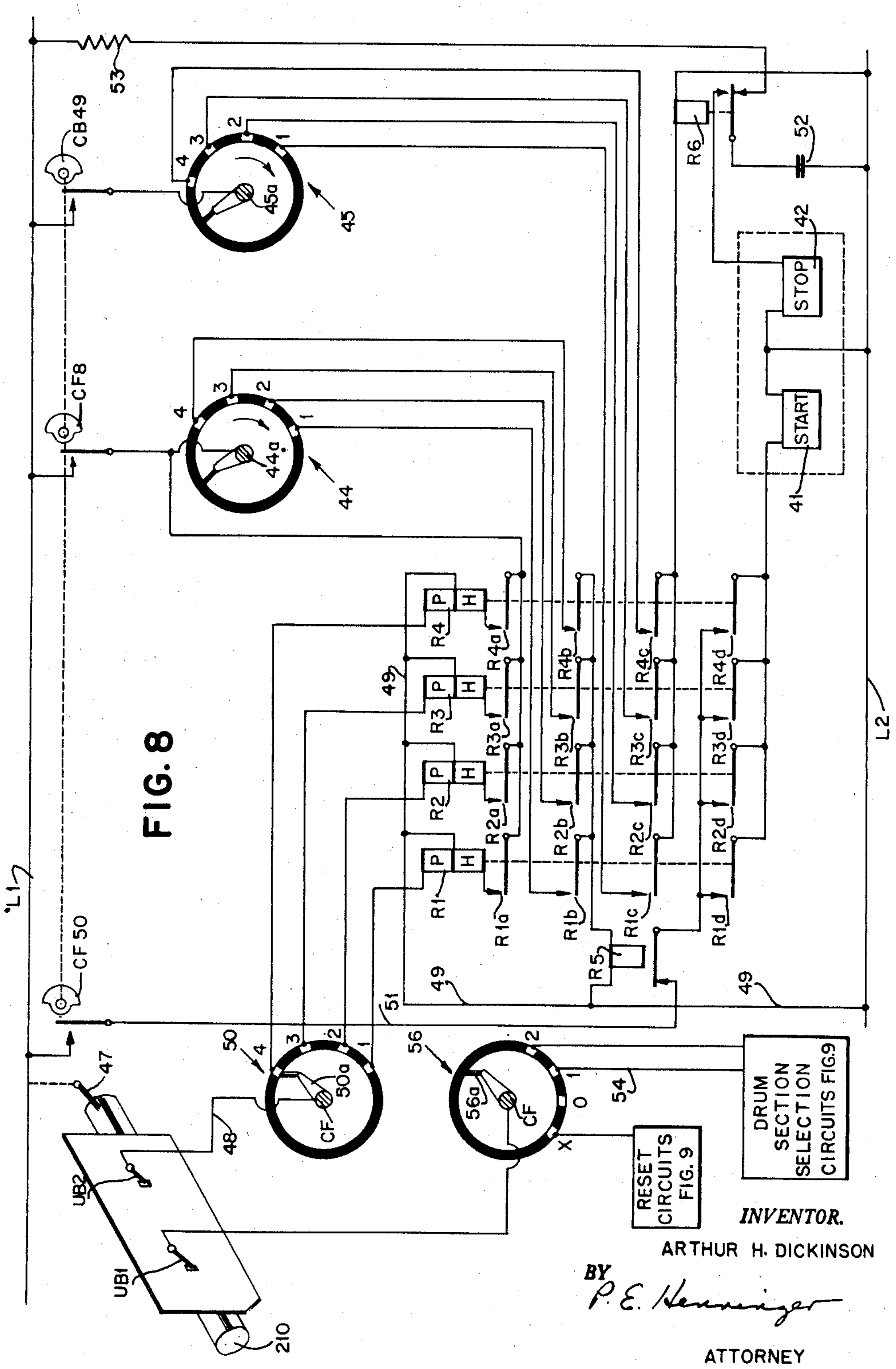
Fig. 8 is a wiring diagram of the phase selection circuits of an apparatus embodying the invention.

*Fig. 8—Phase selection circuits*

The circuits illustrated in Fig. 8 sense perforations in the cards being fed through the machine and respond to these perforations by setting the phase of the drum as indicated by the locations of the perforations. The various rows or index points on the card are sensed at the index times indicated in the first row of the time chart in Fig. 6. The entire sensing operation is completed during the first 216° of a machine cycle.

When the card passes the first reading station, a circuit is completed from a positive supply line $L_1$ through various conventional control contacts (not shown), a brush 47, the common contact roller 210, a brush UB2, a wire 48, and thence to a drum phasing emitter 50, driven by the shaft 199 which includes a rotating brush **50*a* cooperating with four stationary contacts marked 1, 2, 3 and 4, to correspond with the four phases. The four contacts 1, 2, 3 and 4 are connected respectively to the pick-up windings of four relays R1, R2, R3 and R4, and thence through a wire 49** to the grounded supply line $L_2$.

Each of these four relays has a holding winding which is energized by a circuit which may be traced from supply line $L_1$ through a cam operated switch CF8 (closed during the reading portion of a card feed cycle, as illustrated in Fig. 6), and thence through front contacts *a* of the respective relays and the respective holding windings to wire 49 and supply line $L_2$.

As the bush UB2 sweeps across the index points 4, 3, 2, 1 on the card, the brush **50*a* sweeps synchronously across the contacts 4, 3, 2, and 1. When the brush encounters a perforation in the card at the instant the brush 50*a*** is engaging one of its contacts, then a circuit is completed to one of the relays R1, R2, R3 and R4 which is picked up and holds itself up through the holding circuit just described. This holding circuit selects the phase of the drum to or from which data is to be transferred. This circuit remains energized throughout most of the card feeding cycle, being opened only by opening of switch CF8 at 281°, as indicated in Fig. 6.

As illustrated diagrammatically in Fig. 7, the two phasing clutch emitters 44 and 45 are driven only when a change in phase of the data storage drum is being made. The brush **44*a* normally rests on one of the contacts 1, 2, 3 or 4**, depending upon the particular phase in which the data storage drum is established at any given time. The data storage drum normally remains in one of the four phases except when it is being transferred from one phase to another.

The phasing clutch emitter 44 controls circuits for energizing a relay R5, whenever it happens that the phase selected by the card and indicated by the pick-up of one of the relays R1, R2, R3 and R4 is the same as the phase indicated by the position of the phasing clutch emitter 44. Each of the four relays R1 to R4 has a front *b* contact, which is connected in series with one of the contacts of the phasing clutch emitter 44 and with the winding of relay R5. If, for example, relay R1 is energized and brush **44*a* is at the same time on its contact 1, then a circuit is completed from supply line $L_1$ through cam operated switch CF8, brush 44*a*, contact 1**, contact R1*b*, the winding of relay R5 and thence through wire 49 to supply line $L_2$. Energization of relay R5 breaks its single back contact thereby opening the energizing circuits to be described below for the start and stop electromagnets 41 and 42 of the phasing clutch 38. It will be readily understood that if the storage drum is already in the phase indicated by an entering card, it is unnecessary to operate the phase shifting mechanism to change its phase. The phasing clutch emitter 44 and the *b* contacts of relays R1 to R4 check this situation and prevent energization of the phasing clutch 38, if the drum is in fact already in the proper phase. Once the relay R5 is energized, it remains energized until switch CF8 opens at 280°.

If the drum is not in the phase indicated by the perforation in the card, then relay R5 is not energized, and one of the relays R1 to R4 sets up a circuit for energizing the start magnet 41 to initiate a shift in phase of the drum, and the phasing clutch emitter 45 later closes a circuit for energizing the stop magnet 42 to terminate the shifting of the phase of the drum when the correct phase has been established.

Each of the relays R1 to R4 is provided with a front *c* contact and a front *d* contact. If one of the relays R1 to R4 is picked up and relay R5 remains deenergized, then a circuit is completed for the start electromagnet 41. This circuit may be traced from supply line $L_1$ through cam operated switch CF 50 (closed for a short interval after all the phase selecting punches have been scanned by brush UB2, as shown in the timing chart, Fig. 6), wire 51, back contact of relay R5, the closed front *d* contact of one of the relays of R1 to R4, and thence through the start electromagnet 41 to supply line $L_2$. Energization of electromagnet 41 engages the phasing clutch and starts a shift in phase of the drum 1. At the same time the brushes **44*a* and 45*a* start moving around their respective contacts. When the brush 45*a* reaches a stationary contact corresponding to the phase indicated by the particular relay R1 to R4, which is energized, then a circuit is completed for a relay R6. This circuit may be traced from supply line $L_1$ through cam operated switch CB49, phasing clutch emitter 45**, front contact *c* of one of the relays R1 to R4, and thence through the winding of relay R6 to grounded supply line $L_2$.

Energization of relay R6 transfers its single contact from a back position in which a capacitor 52 is charged from lines $L_1$, $L_2$ through a resistor 53, to a front position in which the capacitor 52 may discharge through the stop electromagnet 42. This results in a momentary energization of stop electromagnet 42 which is sufficient to cause disengagement of clutch 38. The phase shift is then completed, and the drum 1 has been established in the phase required by the location of the perforation in the column of the card being sensed by the brush UB2.

Note that the contact segments of the phasing clutch emitter 45 are set somewhat in advance of the contacts of emitter 44. This arrangement is provided to allow time for operation of relay R6 and for termination of movement of the driven parts of the clutch 38 after the stop electromagnet 42 is energized. This also allows the brush **45*a* to coast on to an insulating spot which it occupies when the drum is established in any given phase, so that no circuit for electromagnet R6 will be established on the next machine cycle. Unnecessary impulsing of the electromagent R6** is thereby prevented.

The reading of the card at the first reading station is completed during the first three-quarters of the card feed cycle. At the end of that reading period, cam operated switch CF8 opens.

The drum phasing emitters 44 and 45 are shown diagrammatically in the drawing as comprising four stationary contacts with small insulating spaces between three of the pairs of adjacent contacts and a wide insulating space between adjacent contacts 1 and 4. This manner of spacing the contacts by insulation is selected solely for convenience in making the drawing. It should be understood that the emitter as actually constructed may have equally spaced contacts for all four phases. It may be desirable to have several contacts connected in parallel for each phase, for example, there might be 16 contacts on the periphery of the emitter, with each series of four adjacent contacts representing the series of four phases, and with all the contacts for each phase connected electrically.

Since the drum 1 is rotating four times as fast as the main index shaft 27, any required phase shift may be made by stopping the drum during a portion of the last 90° of a card feed cycle. Consequently, when the card approaches the second reading station, the drum is already set in the phase into which data is to be read from the card.

Figure 9:
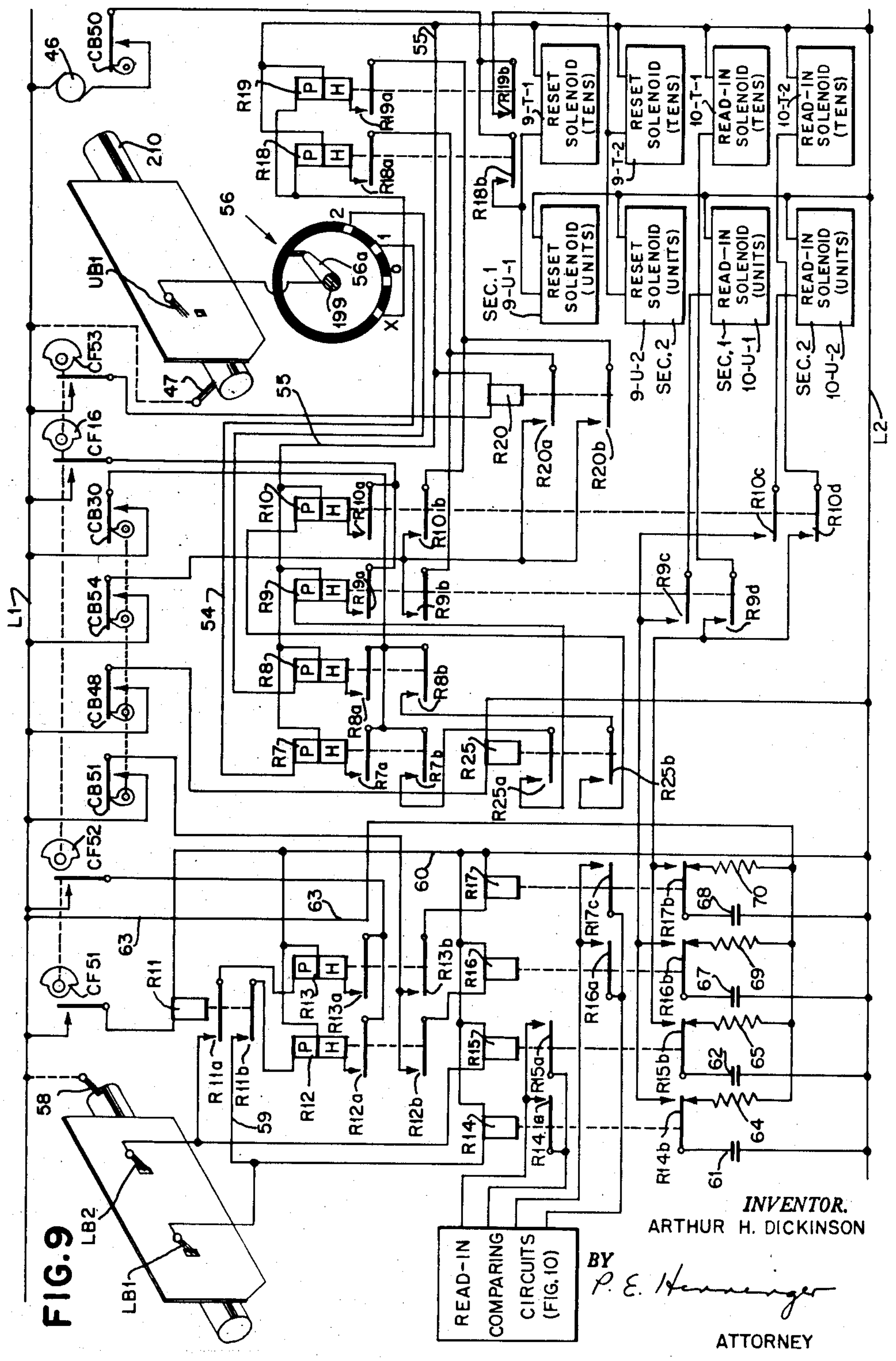
Fig. 9 is a wiring diagram of the read-in and reset circuits of an apparatus embodying the invention.

*Fig. 9—Section selection circuits*

When the card is read in the first card feed cycle, at the first card reading station, a brush UB1 scans a column of the card which is perforated to select one section of the drum. In the particular drum construction illustrated, two of the four rows of pins are termed section 1 and the other two rows are termed section 2. (It will readily be recognized that the drum may be constructed to have as many sections as desired, and each section may have as many rows of pins as desired.) These two sections of the drum may be selected by a "1" or a "2" perforation in the particular column of the card which is concerned with section selection. In the particular example chosen, assume that there is a perforation in the "1" space in the section selecting column. When that perforation comes opposite the brush UB1, Figs. 8 and 9, then a drum section emitter 56 driven by the shaft 199 has its brush **56*a* engaging a stationary contact 1. There is thereby established an energizing circuit for the pick-up winding of a relay R7. This circuit may be traced from supply line $L_1$ through certain conventional cam operated switch contacts (not shown) to brush 47, and thence through contact roller 210, brush UB1, brush 56*a* and contact 1 of drum section emitter 56, and thence through wire 54 and the pick-up winding of relay R7 to wire 55** and grounded line $L_2$.

When the pick-up winding of relay R7 is energized, a circuit is completed through the *a* contact of that relay to its holding winding. This holding circuit may be traced from supply line $L_1$ through cam operated switch contact CB30, contact *a* of relay R7, the holding winding of relay R7 and thence through wire 55 to grounded supply line $L_2$. Switch contact CB30 is closed during the first 270° of the machine cycle, as indicated in Fig. 6.

A relay R25 is controlled by cam CB48, which closes an obvious circuit for energizing R25 at 234° index time, after the scanning of the station selecting column is completed, and maintaining it energized until 285° index time, slightly after CB30 opens its contacts.

When the relay R7 picks up, its *b* contact prepares a circuit for the pick-up winding of relay R9, which is completed after relay R25 picks up. This circuit may be traced from supply line $L_1$ through cam operated switch CB30, the *b* contact of relay R7, the *a* contact of relay R25, the pick-up winding of relay R9 and thence through wire 55 to the grounded supply line $L_2$. Relay R9 operates a holding contact *a*, a section selection reset contact *b* and section selecting read-in contacts *c* and *d*. Relays R8 and R10 are provided, corresponding respectively to relays R7 and R9, except that relays R8 and R10 cooperate with drum section 2, whereas relays R7 and R9 cooperate with drum section 1.

Relays R7 and R8 receive and store a section selection indicated on a card passing the upper reading station. After the reading is over, but during the same card feed cycle, the stored selection is transferred to relays R9 and R10, which govern the section of the drum 1 into which information in other columns of the card is read at the lower reading station during the following card feed cycle.

When relay R9 is picked up during a read-in cycle, the read-in solenoids 10–U–1 and 10–T–1 of section 1 are controlled in accordance with the data read on the cards at the second reading station. When relay R10 is picked up during a read-in cycle, solenoids 10–U–2 and 10–T–2 of section 2 are similarly controlled.

When relay R9 picks up, it closes a holding circuit which may be traced from supply line $L_1$ through cam operated switch CF16, contact *a* of relay R9, the holding winding of relay R9 and thence through wire 55 to grounded supply line $L_2$. Contact CF16 is normally closed, but opens during the card feed cycle at 225° and closes at 240°.

By virtue of this arrangement, the machine enters the last 120° of each card feed cycle with only one of the relays R9 and R10 picked up, depending upon which section has been selected by the card whose section selecting column was scanned at UBI during the first 216° of the cycle. This relay R9 or R10 remains energized for the last 120° of the card feed cycle, and during the first 216° of the following card feed cycle. This arrangement ensures that the following read-in operation, described immediately below, is directed to the proper drum section.

*Fig. 9—Read-in circuits*

The phase and the section of the drum in which a data transfer operation is to take place are established during the first card feed cycle following the entry of a card into the machine, in accordance with the perforations in certain columns which are scanned by the brushes UB1 and UB2 at the first card reading station. After the section selection and phase selection are complete, the card passes to a second card reading station, adjacent brushes LB, and certain other columns of the card, carrying perforations defining data to be read into the selected phase and section of the drum, are read at this second card reading station.

The data is punched on the card according to the decimal system and is to be recorded in the drum in accordance with the bi-quinary system, as described above. In order to accomplish a translation of the punched data from the decimal system to the bi-quinary system, the drum is rotated through two revolutions while the brushes LB1 and LB2 scan the columns of perforations on the card. In the arrangement shown, the brushes scan the higher numbers first, i.e. they first scan the number 9 and then proceed to scan 8, 7, 6, etc., down to zero. During the scanning of the first four digits, namely 9, 8, 7 and 6, a cam operated switch CF51 is closed (see Fig. 6). The switch CF51 controls an obvious energizing circuit for a relay R11.

Assume that the brush LB1 scans the units column on the card and the brush LB2 scans the tens column. If one of these brushes encounters a perforation while the relay R11 is picked up, then an energizing circuit is completed for the pick-up winding of either relay R12 for the units column or relay R13 for the tens column. The energizing circuit for pick-up winding of relay R12 may be traced from supply line $L_1$ through suitable conventional cam operated switches (not shown), brush 58, contact roller 211, units brush LB1, wire 59, contact *b* of relay R11, pick-up winding of relay R12 and thence through wire 60 to grounded supply line $L_2$. If the brush LB2 encounters a perforation in the tens column at one of the positions corresponding to 9, 8, 7, or 6, a similar circuit is established for the pick-up winding of relay R13. The relays R12 and R13 are provided with holding contacts *a* and "5" register contacts *b*. When either of these relays is picked up, it closes a holding circuit which may be traced from supply line $L_1$ through cam operated switch CF52, the holding contact *a* and the holding winding of the particular relay involved and thence through wire 60 to grounded supply line $L_2$. At the same time that relay R12 or R13 is picked up, the brush LB1 or LB2 completes a circuit for momentarily energizing a relay R14 or R15. These relays control *a* contacts that are connected in the read-in comparing circuits described below in connection with Fig. 10 and also control *b* contacts which effect operation of the read-in solenoids 10. The *b* contacts of relays R14 and R15 normally engage stationary back contacts and complete charging circuits for capacitors 61 and 62. The charging circuit for capacitor 61 may be traced from supply line $L_1$ through a wire 63, a resistor 64, back contact *b* of relay R14 and capacitor 61 to grounded supply line $L_2$. The charging circuit for capacitor 62 may be similarly traced through resistor 65.

Energization of either of relays R14 and R15 causes its *b* contact to transfer to the stationary front contact and establish a discharge circuit for the capacitor 61 or 62 through one of the read-in solenoids 10 (see Figs. 1 and 2). For example, the discharge circuit for capacitor 61 may be traced from that capacitor through front contact *b* of relay R14, a wire 66, front contact *c* of section selecting relay R9 and thence to the units read-in solenoids 10–U–1. (Solenoid 10–U–1 is the read-in solenoid for the units column of section 1. The other read-in solenoids have similar dseignations, T representing the tens column.) If the brush LB1 scans a perforation at 9 in its column, then the read-in solenoid 10–U–1 is energized at the time when the "4" pin for its particular phase is passing the read-in solenoid 10. Energization of the solenoid 10 at that time is effective to cause the fingers 22 to engage that "4" pin and shift it to its outer position.

As the drum continues to rotate, the cam operated switch CB51 closes its contacts during the time when the "5" pins of the selected phase are passing the read-in solenoid. Closure of the contact CB51 completes a circuit for the relays R16 or R17 or both of them depending upon the positions of the relays R12 and R13. As pointed out above, relays R12 and R13 are energized whenever a quantity greater than 5 is sensed in one of the perforated columns on the card. Relays R16 and R17 are provided with *a* contacts connected to the read-in comparing circuits to be described in connection with Fig. 10, and with *b* contacts which control charging and discharging circuits for capacitors 67 and 68, respectively. Capacitors 67 and 68 are charged through resistors 69 and 70, respectively, when the associated *b* contacts of relays R16 and R17 are engaging stationary back contacts, and are discharged through one of the read-in solenoids when their *b* contacts are engaging front contacts. A discharge circuit for one of the capacitors 67 and 68 is closed only after a digit higher than 5 is sensed by one of the brushes LB1 and LB2 and is effective to energize the read-in solenoid for that section, phase, and numerical order so as to set the "5" pin in its out position.

For example, if the brush LB1 senses a perforation at 9, then relay R14 is energized immediately, and is then effective, to energize solenoid 10–U–1 to pull out the 4 pin for that phase, section and numerical order. At the same time, relay R12 is energized and picks up on its holding circuit. Subsequently, when the 5 pin for that order passes that read-in solenoid, the relay R16 picks up and actuates the read-in solenoid 10–U–1 to set up the 5 pin. Consequently, both the 5 and 4 pins in the phase are set in their outer positions, indicating a total of 9 in the bi-quinary code.

If the perforation in the column being scanned by one of the brushes LB1 or LB2 is 5 or less, then the relay R11 is not energized at the time when the perforation is scanned, since the circuit of the relay winding is then open at the contact CF51. Consequently, only the relays R14 and/or R15 are energized to operate the corresponding solenoids at the proper time to set the pins for digits less than 5. For such an operation, only one pin is pulled out in the selected phase, section, and numerical order.

*Fig. 9—Reset circuits*

When it is desired to clear the drum, that is, to reset all the pins in one section and phase of the drum to their zero positions, then a card is supplied to the machine carrying in the section selecting column an "X" perforation in addition to the section selecting perforation. As the drum section emitter 56 operates on shaft 199 synchronously with the scanning of the column, then in addition to the energization of one of the section selecting relays R9 and R10 as previously described, relays R18 and R19 are energized.

Relays R18 and R19 are provided with holding contacts *a* and with section selecting contacts *b*. The holding circuits for relays R18 and R19 extend over a front contact *a* or *b* of a relay R20 in parallel with one of the section selecting *b* contacts of relays R9 and R10. The holding circuit for relay R18, for example, may be traced from supply line $L_1$ through cam operated switch CB54, front contact *b* of relay R9 in parallel with front contact *a* of relay R20, holding contact *a* of relay R18, the holding winding of relay R18 and thence through the wire 55 to grounded supply line $L_2$. Relay R20 is controlled through an obvious energizing circuit by a cam operated contact CF53. Contact CF53 is closed only during a short time at the beginning of second half of the card feed cycle and cooperates with relay R20 to maintain the holding circuits of R18 and R19 during a time when the contacts of both the section selecting relays R9 and R10 may be opened.

Although both the relays R18 and R19 are picked up when an X contact is sensed in the section selecting section of the card, one of them is later dropped out if there is no punch corresponding to its section. This dropping out takes place when relay R20 is de-energized and is effective if the *b* contact of the corresponding section selecting relay R9 or R10 is not then closed. After the relay R20 drops out, any section or sections whose reset R18 or R19 remains energized then has its reset solenoids 9 pulsed with a series of five impulses under the control of the drum commutator 46 and a cam operated switch CB50, and the *b* contacts of the relays R18 and R19. The commutator 46 is effective to pulse each selected reset solenoid five times, as each of the pins in the selected phase is passing it. This pulsing of the reset solenoids 9 is effective to cause the fingers 22 to engage successively any pin or pins of the phase which are in their outer or "1" positions and restore them to their inner of "0" positions. As pointed out in connection with Fig. 1 above, the spacing between the flanges 5*a* and 5*b* on the pins is wide enough so that there is no interference between the fingers 22 and any pin which is already in its "0" position.

Figure 10:
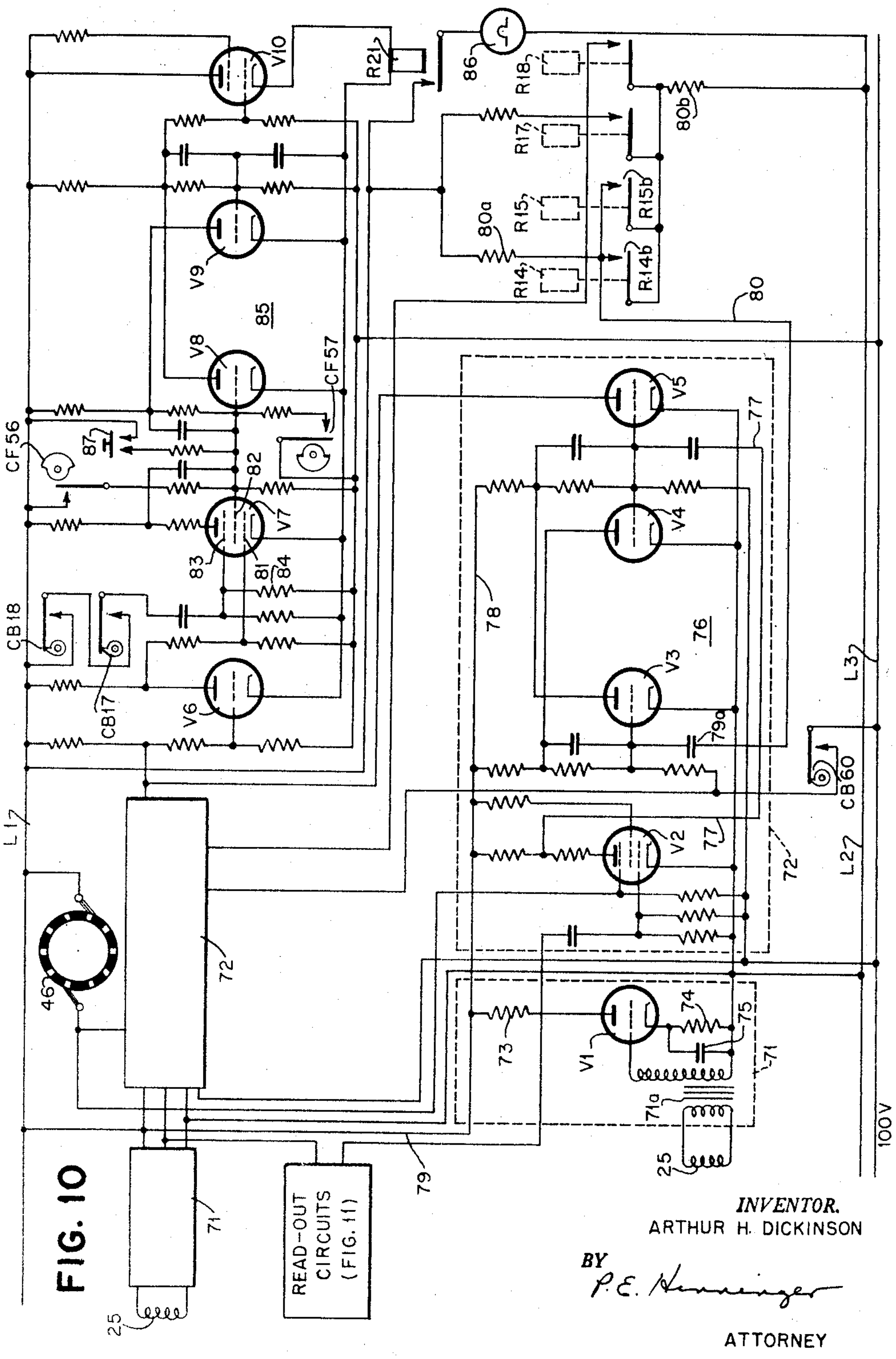
Fig. 10 is a wiring diagram of the checking and error signal controlling circuits in an apparatus embodying the invention.

*Fig. 10—Read-in comparing circuit*

As shown in Fig. 2, there is provided a pick-up coil 25 for each row of pins on the data storage drum 1. As described above in connection with Fig. 9, there is provided a series of four read-in relays R14, R15, R16 and R17, one of which is energized whenever a pin is set from its "0" position to its "1" position. If the apparatus is functioning properly, then the setting of a pin follows as a consequence of the energization of one of these relays. The circuits of Fig. 10 compare the conditions of the read-in relays R14 to R17 with the potentials induced in the corresponding pick-up coils 25 by the passing pins. In this way, a check of the pin setting mechanism is obtained. If, after a predetermined short time, the pins are not set to correspond to the conditions of the read-in relays, then a signal is actuated to inform the machine operator that an error has been made. The relay which controls the signal may also control circuits to shut down the power to the machine when an error occurs.

Each pick-up coil 25 is provided with a comparing circuit. Referring now to Fig. 10, there is shown in detail the comparing circuit for one of the pick-up coils 25, and a signal controlling circuit which cooperates with all the comparing circuits.

Coil 25 is connected to a pre-amplifier and inverter unit 71 which comprises an input transformer 71*a*, a triode V1, resistors 73 and 74, and a capacitor 75. The connections of these circuit elements are conventional and require no further explanation here. The output from the pre-amplifier 71 is fed into a comparing circuit 72, Corresponding pre-amplifiers 71 and comparing circuits 72 are provided for the other pick-up coils 25. The output of each pre-amplifier 71, in addition to feeding the comparing circuit 72, is transmitted to a read-out circuit, illustrated in Fig. 11.

The comparing circuit 72 comprises a pentode V2, a trigger circuit 76 including triodes V3 and V4, and an output triode V5. The pentode V2 responds to amplified signals received from the pre-amplifier 71. One of the grids of the pentode V2 is controlled by the drum commutator 46 so that the pentode can become conductive only during those intervals when a pin of the selected phase is passing the pick-up coil 25.

The output of pentode V2 is connected through a wire 77 to the grid of triode V4 in the trigger circuit 76. The normal condition of the trigger circuit 76 is its Off condition, i.e. with its left-hand tube V3 conducting. It is reset to this Off condition at the end of each machine cycle, when the contact CB60 opens. This contact connects the grid of the tube V3 with a suitable bias line $L_3$ maintained at a negative potential of, for example, 100 volts. When the switch CB60 opens, the grid of tube V3 tends to assume the potential of the positive supply line $L_1$, to which it is connected through two parallel paths, one including suitable resistors and wires 78 and 79, the other extending through condenser 79*a*, wire 80, and a resistor 80*a*, so that tube V3 then becomes conductive, cutting off the tube V4.

When one of the read-in relays R14 or R15 is energized, its *b* contact applies ground potential through resistor 80*b* (having a substantially lower resistance than resistor 80*a*) and wire 80 to the grid of tube V3, cutting that tube Off and allowing tube V4 to go On. When tube V4 turns On, the output tube V5 is also turned on, thereby raising the potential of the grid of input tube V6 in the signal control circuit. The output of tube V6 is coupled to a grid 81 of a pentode V7. The pentode V7 has characteristics such that it can not conduct unless all three of its grids 81, 82 and 83 are properly positively biased. Grid 82 is normally negatively biased, but is positively biased during the read-in portion of a card feed feed cycle by closure of contact CF56. The grid 83 is normally negatively biased through a resistor 84, and is positively biased only when cam operated contacts CB17 and CB18 are both closed. These switch contacts are connected in series between grid 83 and positive supply line $L_1$. The contacts CB17 and CB18, as indicated in Fig. 6, are simultaneously closed periodically during the machine cycle, at times after the reading-in of each digit is completed.

Energization of one of the relays R14 or R15 should result in the setting of a pin and the production of an impulse in the corresponding pick-up coil 25. As outlined above, operation of one of the relays R14 and R15 causes the trigger circuit 76 to switch to its On condition with the tube V4 conducting. If the operation of relay R14 or R15 correctly sets the desired pin, then an impulse is received through pick-up coil 25 and amplified through tubes V1 and V2, and transferred to the grid of tube V4 to cut if off and return the trigger 76 to its Off state. With trigger 76 Off, associated tube V5 is nonconductive and its anode is at high potential. Consequently tube V6 is rendered conductive and its output is at low potential. Thus tube V7 is maintained at cut-off bias potential. This happens before the simultaneous closure of the contacts CB17 and CB18. Consequently, if the pin is properly set in response to energization of one of the read-in relays, then the tube V7 remains nonconductive.

The output of tube V7 is connected to the grid of a triode V8 which, together with a triode V9 comprises a trigger circuit 85. Trigger circuit 85 is initially reset Off (tube V8 conducting) by cam switch CF57 and is switched to its On condition when an inverted impulse is received from pentode V7. The output of trigger 85 controls a power tube V10 whose cathode is connected in series with the winding of a relay R21. Relay R21 operates a contact controlling an obvious circuit for energizing a signal 86, which indicates that an error has occurred in the read-in operation.

While only the circuits for one pick-up coil 25 have been described, hence only the circuits for one numerical order of one section of the drum, it will be readily understood that similar comparing circuits are provided for all orders of all sections of the drum. All of the comparing circuits are connected to the input of tube V6, which is the input tube for the common signal control circuit.

After the signal is one turned On, it may be cut off by manipulating a reset button 87, which returns the trigger 85 to its Off condition.

Figure 11:
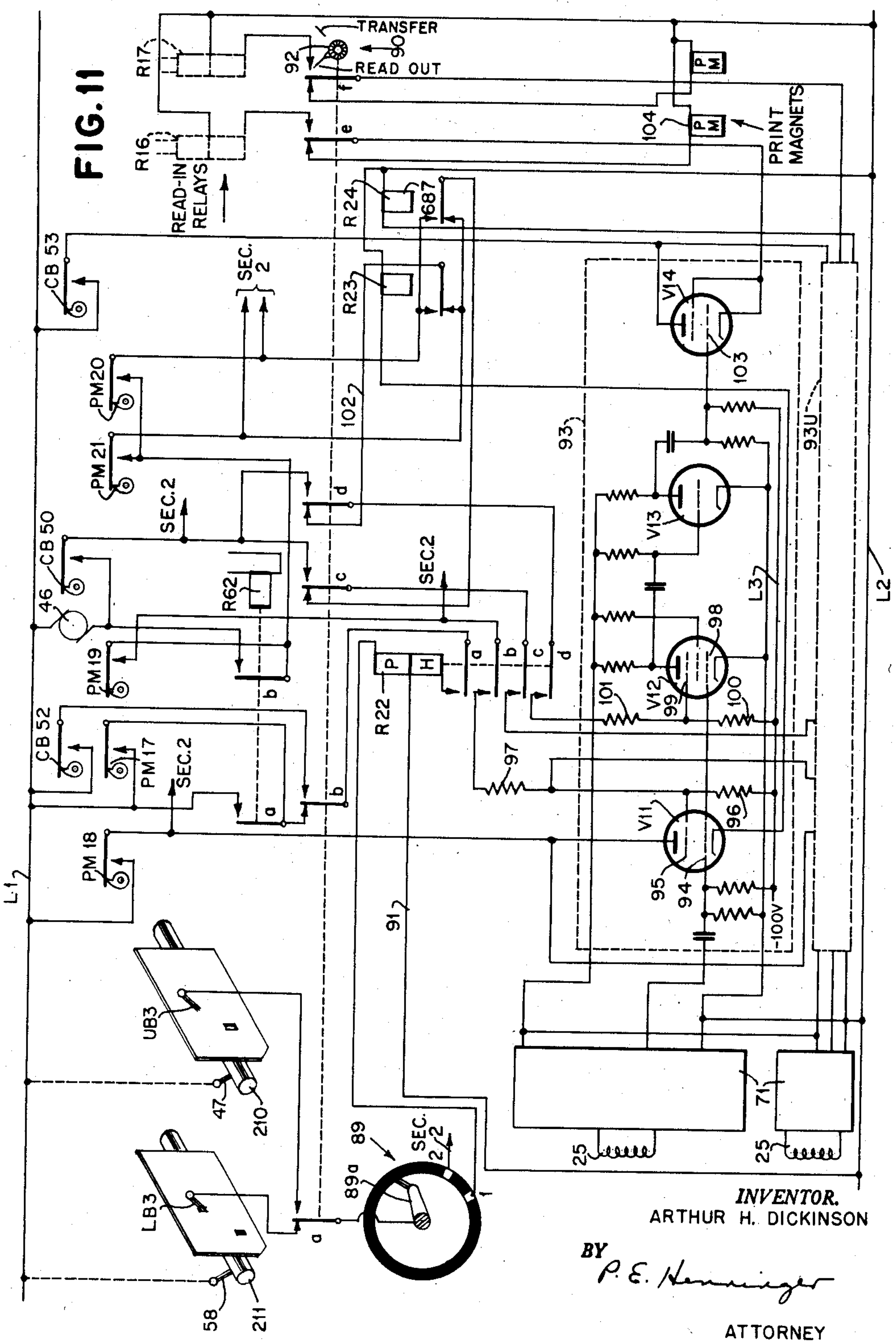
Fig. 11 is a wiring diagram of the read-out and section transfer circuits.

*Fig. 11—Read-out circuits*

The read-out circuits for the data storage drum are illustrated in Fig. 11. Typically, these circuits are utilized to read information out from the drum to a printing mechanism. Alternatively, data may be transferred from the drum to any other suitable data utilizing mechanism, the specific nature of that mechanism being immaterial with respect to the present invention.

When a card moving through the machine passes through the second card feed cycle, it passes the second card reading station adjacent brushes LB. The movement of the card past the brushes LB is coordinated with the movement of a read-out emitter 89 having a brush 89*a* which moves over contact segments corresponding to the several sections of the drum. In the present instance, it is assumed that there is a perforation at the "1" index point in the column being scanned by brush LB3, which perforation comes opposite the brush at the same time that the brush 89*a* of emitter 89 contacts its "1" contact. A circuit is then completed for a read-out section selection relay R22. One such relay is provided for each section of the storage drum. Fig. 11 shows the relay and associated circuits for one drum section only. It will be readily understood that the relays and circuits for the other sections are similar.

The relay R22 is provided with four contacts, respectively identified as the *a*, *b*, *c* and *d* contacts. The *a* contact is connected in a holding circuit for relay R22. This holding circuit may be traced from positive supply line $L_1$ through cam operated switch PM17 in parallel with the *a* contact of relay R62, and thence through the *b* contact of a transfer switch 90, the *a* contact of relay R22, the holding winding of that relay and thence through a wire 91 to a grounded supply line $L_2$.

Relay R62 is picked up in response to any desired manually or automatically controlled circuit, whenever it is required to read out data from the storage drum. For example, the relay R62 may be identical with the minor auto control relay R26 of the Rubidge et al. Patent 2,340,772, and may be energized by the circuits for that relay as disclosed in that patent. Alternatively, relay R62 may be energized by a circuit controlled by a manually operated switch.

The transfer switch 90 has two positions, a read-out position in which it is shown and a transfer position in which it is set when it is desired to transfer data from one drum section to another. The switch 90 is illustrated as being manually operated by a knob 92. Alternatively, other equivalent arrangements may be used. For example, the switch may be arranged for automatic operation in response to a perforation at a predetermined location on a card. As another alternative, plug board connections may be used.

The positions of the pins in the data storage drum are sensed by the coils 25. Each coil 25 is connected to a pre-amplifier 71, described more completely in connection with Fig. 10. The output of each pre-amplifier 71 is connected to a read-out control unit generally indicated at 93.

In the control unit 93, the output of each pre-amplifier 71 is connected in parallel to a grid 94 of a Thydratron tetrode V11, and a grid 98 of a pentode V12. The Thyratron V11 serves only to check the setting of the "5" pins. The plate circuit of the Thydratron V11 is controlled by a cam operated switch PM18, which is closed early in a reading-out cycle. The Thyratron V11 has a second grid 95 connected through a resistor 96 to a negative bias potential line $L_3$. The grid 95 is also connected to positive line $L_1$ through a resistor 97, contact *b* of relay R22, cam operated switch contact PM19, contact *b* of relay R62, and thence through commutator 46 to the positive supply line $L_1$.

In order to make the Thyratron V11 conductive, a signal impulse must be received on grid 94 from the pre-amplifier 71 and the grid 95 must be momentarily positive. The switch PM19 in series with grid 95 is closed only during a short interval when the "5" pins of the four phases on the drum are passing the pick-up coil 25. Consequently, if the "5" pin of the selected phase and drum section is set in its outer position, the Thyratron V11 will be tripped and will become conductive. Connected in series with the cathode of Thyratron V11 is the winding of a "5" checking relay R23. Once the Thyratron V11 is tripped, it and relay R23 remain energized until switch PM18 opens after the reading-out operation is completed.

Control impulses from pick-up coil 25 and pre-amplifier 71 also pass to the grid 98 of a pentode V12. Pentode V12 also has a grid 99 connected through a resistor 100 to the negative bias line $L_3$. The grid 99 is also connected through a resistor 101, contact *d* of relay R22, left-hand contact *d* of the transfer switch 90, and a wire 102 to the contact of relay R23. When relay R23 is de-energized, this connection for grid 99 extends through the back contact, thence through a cam operated switch PM21, contact *b* of relay R62 and commutator 46 to the positive supply line $L_1$. When relay R23 is energized, this connection extends through the front contact of that relay and through cam operated switch PM20 in place of PM21.

The printing mechanism of machines of the type described is arranged, as described in connection with Figs. 4 and 5, to select the number to be printed as a function of the time during the machine cycle in which an energization of the printing electromagnet occurs. The relay R23 and the contacts PM20 and PM21 cooperate to distinguish between a bi-quinary digit greater than 5 and a bi-quinary digit less than 5 and to shift accordingly the energization of the printing electromagnets so that they print the proper decimal digit. Contact PM20 is closed only during the interval when the digits 9, 8, 7, 6, 5, may be selected by energization of the print magnets, and contact PM21 is closed only during the interval when one of the digits 4, 3, 2, 1 may be selected by energization of the print magnets. If no "5" pin is sensed by the pick-up coil 25 at the beginning of the printing cycle, relay R23 is not picked up, and the tube V12 cannot be energized during the first revolution of the storage drum during that cycle, since the switch contact PM21, which then controls the grid 99, is open throughout that first revolution of the data storage drum. However, during the second revolution of the data storage drum, switch PM21 controlling the grid 99 is closed and the tube V12 becomes conductive upon the sensing of any pin by the pick-up coil 25.

When tube V12 becomes momentarily conductive, a controlling pulse is transmitted from the output circuit to the input of a triode V13, which is normally conductive and which serves as an inverter tube. The output of tube V13 is connected to the grid 103 of a Thyratron V14 and is effective to make Thyratron V14 conductive. The cathode of Thyratron V14 is then connected through a back contact *e* of transfer switch 90 to a print magnet 104.

The printing mechanisms of devices of this type are arranged so that a preselection of numerals to be printed is completed for all the type bars of the numerical orders, either in succession or simultaneously, and after all the digits are preselected the printing mechanism is actuated to produce a printing operation of the previously selected type bars. After a digit is selected for a given type bar, a further digit-selecting operation for that type bar, before the printing operation, is ineffective.

Consequently, if a bi-quinary 9 is stored on the drum pins, the type bar is set to print at 9 the first time the "4" pin of the storage drum passes the pick-up coil. After the print bar has been once set, a further energization of the print magnet on the same printing cycle will not disturb the position of the print bar. Consequently, although the print magnet is again energized when the "4" pin passes the pick-up coil, during the second revolution of the data storage drum, that second energization of the print magnet does not actuate the printing mechanism or change its position, because the latch 232 can only be released once between resetting operations, and it has already been released. If the digit registered in the data storage drum is a number less than 5, then Thyratron V11 is not tripped, relay 23 is not picked up and the grid 99 of the tube V12 remains under the control of contact PM21, which is open during the first revolution of the data storage drum and closed only during the second one. During that second revolution, any energization of the print magnet 104 will cause the printing of a 4, 3, 2 or 1, depending upon the time when the energization takes place.

The Thyratron V14 is provided to prolong the energization of the print magnet 104 so as to secure a sufficient flow of current through it to ensure its actuation. The momentary impulse provided by pentode V12 might not energize a conventional print magnet long enough to select a character to be printed.

*Section transfer circuits*

When it is desired to transfer stored data from one section of the drum to another, the transfer switch 90 must be moved from the position shown to its right-hand position wherein the contacts engage right-hand stationary contacts instead of the left-hand ones. During such a transfer operation, no printing is taking place and PM cams are not rotating, but remain in their latching position indicated at 330° in Fig. 6.

The *a* contact of the transfer switch places the selection of the drum section which is to be read out under the control of the first card reading station. The selection of the data receiving section is also made at the first card reading station as described above in connection with Fig. 8. Since there is no problem of translation between the bi-quinary system and the decimal system in this data transfer operation, the Thyratron V11 and the relay R23 are not used. Their circuit remains open at switch contact PM18.

As the pins pass the pick-up coil 25, they cause transmission of a signal impulse through tubes V12, V13 and V14, which is now connected in series with a coil of read-in relay R16. The section selection circuits for the receiving section are the same as those shown in Fig. 9 for the reading-in operation. The reading-in operation is performed by relay R16 in the manner described above in connection with Fig. 9.

The read-out control unit 93 illustrated in detail in Fig. 11 is for a tens order pick-up coil 25. A similar read-out control unit 93U is used for the units order, and other such control units are provided for the various numerical orders of the other storage sections of the drum.

While I have shown and described a preferred embodiment of my invention, other modifications thereof will readily occur to those skilled in the art, and I therefore intend my invention to be limited only by the appended claims.

I claim:

1. A data storage device, comprising a pin shiftable longitudinally between first and second data storing positions, means effective to hold said pin releasably in either of said positions, and means operable selectively to move the pin longitudinally to said first position or to said second position, said pin moving means comprising a pin driving member having a normal position in which it is spaced from said pin and movable from said normal position in opposite directions, said member being effective upon movement from said normal position in one and the other of said opposite directions to engage the pin and drive it to one and the other of said first and second positions, respectively.

2. A data storage device as defined in claim 1, including transverse moving means for producing relative movement of the pin and said longitudinal pin moving means in a sense transversely of the pin axis, said longitudinal pin moving means comprising longitudinally spaced collars on the pin, a finger movable along a path transverse to the pin axis and extending between said collars, said path extending through a normal central position between said collars in which the pin engages neither collar, and means for moving said finger selectively in either longitudinal direction as it passes said collars to engage one of said collars and move said pin to one of its first and second positions.

3. A data storage device as defined in claim 2, in which said finger moving means comprises an armature, means biasing said armature to a central position, and a pair of electrical coils encircling said armature on opposite sides of its central position, each of said coils being effective when energized to attract the armature to its side of the central position, and means for selectively energizing said coils.

4. A data storage device, comprising a pin shiftable longitudinally between first and second data storing positions, means effective to hold said pin releasably in either of said positions, and means operable selectively to move the pin longitudinally to said first position or to said second position, said pin being at least in part of magnetic material, and pin position sensing means comprising a coil at least at times electromagnetically linked with the magnetic part of said pin and having an impedance varying with the pin position.

5. A data storage device as defined in claim 4, in which said magnetic material is permanently magnetized, and including means for relatively moving said pin and said coil and effective upon such movement to set up in said coil an electromotive force having a first or a second value dependent upon whether the pin is in its first or second position.

6. A data storage device, comprising a plate movable along a predetermined path, at least one row of aligned elements supported in apertures in said plate, each element being movable in its aperture between first and second data storing positions, a stationary support adjacent said plate, means for selectively moving said elements comprising a member mounted on said support for movement between a normal position in which said elements pass said member freely and an active position corresponding to one of said first and second element positions, said member being effective to engage a passing element drivingly upon movement of the member away from said normal position, means biasing said member to said normal position, means including an electric coil effective when said coil is energized to move said member, a capacitor, means for charging said capacitor, means to discharge said capacitor through said coil and thereby to move said member quickly from its normal position to its active position, said biasing means being effective when the capacitor is substantially discharged to restore the member quickly to its normal position, and means for synchronizing the discharge of the capacitor through the coil selectively with the passage of the elements past said member, to shift selectively the data storing positions of the elements.

7. A data storage device, comprising a generally cylindrical drum rotatable about its axis, a plurality of circumferentially aligned pins in said drum, each pin being movable radially between first and second data storing positions, a stationary support adjacent said drum, means for selectively moving said pins comprising a member mounted on said support for movement between a normal position in which said pins pass said member freely and an active position corresponding to one of said first and second pin positions, said member being effective to engage a passing pin drivingly upon movement of the member away from said normal position, means biasing said member to said normal position, means including an electric coil effective when said coil is energized to move said member, a capacitor, means for charging said capacitor, means to discharge said capacitor through said coil and thereby to move said member quickly from its normal position to its active position, said biasing means being effective when the capacitor is substantially discharged to restore the member quickly to its normal position, and means for synchronizing the discharge of the capacitor through the coil selectively with the passage of the pins past said member, to shift selectively the radial positions of the pins.

8. A data storage device as defined in claim 7, in which said member is movable from said normal position in opposite directions to either of two active positions corresponding to the first and second positions of the pins, and including a second coil, each of said coils being effective when energized to move the member to one of its two active positions, and means for energizing said second coil synchronously and selectively with the passage of the pins past said member.

9. Data storage apparatus for use with data source cards punched at different localities to indicate different values, comprising cyclically operating means for reading data from punched cards, including means operable at successive times within a cycle to read data from corresponding successive localities on a card, a data storage drum rotatable about its axis, at least one row of data storage elements on the periphery of said drum, each row of storage elements comprising a plurality of phases of elements, each phase comprising a plurality of pins corresponding in number to the number of successive localities on a card and spaced by equal angles about the drum periphery, the pins of each phase being spaced from the corresponding pins of each other phase by respectively equal angles smaller than the angle between two pins of the same phase, a data transfer device adjacent each row of storage elements, means connecting said drum to said data reading means for concurrent rotation therewith with the successive pins of one phase passing said data transfer means concurrently with the reading of successive localities on a card, and phase shifting means in said connecting means operable to bring the pins of any of the other phases selectively into cooperation with said data transfer means concurrently with the reading of successive localities on a card.

10. Data storage apparatus comprising a drum rotatable about its axis, at least one row of peripherally spaced pins on said drum, each pin being radially movable between first and second data storing positions, means for rotating said drum, stationary means adjacent a locality in the path through which the pins move as the drum rotates, said stationary means including cooperating data transfer means adapted when electrically energized to cooperate with the passing pins to transfer data between said pins and said transfer means, means operating synchronously with said drum rotating means and operable to energize said data transfer means only at predetermined angular positions of said drum, and means for shifting the angular position of the drum relative to the drum rotating means to change the angular positions of the drum at which said data transfer means may be energized.

11. Data storage apparatus comprising a drum rotatable about its axis, at least one row of peripherally spaced pins on said drum, each pin being radially movable between first and second data storing positions, each row of pins comprising a plurality of phases of pins, each phase comprising a plurality of pins spaced by equal angles about the periphery of the drum, the pins of each phase being spaced from the corresponding pins of each other phase by respectively equal angles smaller than the angle between two pins of the same phase, means for rotating said drum, stationary means adjacent a locality in the path through which the pins move as the drum rotates, said stationary means including cooperating data transfer means adapted when electrically energized to cooperate with the passing pins to transfer data between said pins and said transfer means, means operating synchronously with said drum rotating means and operable to energize said data transfer means only at predetermined angular positions of said drum, said predetermined angular positions being spaced apart by angles equal to the angles between the pins of one phase, so that said data transfer means cooperates at any given time with the pins of only one phase, and means for shifting the angular position of the drum relative to the drum rotating means by an angle equal to the spacing between corresponding pins of two phases, so as to change the phase with which the data transfer means cooperates.

12. Data storage apparatus as defined in claim 11, in which said data transfer means comprises means to shift the pins between their first and second data storing positions.

13. Data storage apparatus as defined in claim 11, in which said data transfer means comprises means to sense the positions of said pins.

14. Data storage apparatus as defined in claim 11, in which: said drum rotating means comprises motor means, a differential gear having two input gears and one output gear, means connecting said motor means to one input gear, and means connecting said output gear to said drum; and said drum position shifting means comprises means for connecting and disconnecting said motor means to the other input gear.

15. Data storage apparatus as defined in claim 14, in which said connecting and disconnecting means comprises a clutch, operating means for said clutch including a first electromagnet effective when energized to cause engagement of said clutch and a second electromagnet effective when energized to cause disengagement of said clutch, phase selecting means for controlling energization of said first electromagnet, phase indicating means driven concurrently with said other input gear, and means including said phase selecting means and said phase indicating means and effective when the phase indicated is the same as the phase selected to energize said second electromagnet.

16. Data storage apparatus as defined in claim 15, in which said phase selecting means comprises a perforated record, and means for sensing the perforations in said record.

17. Data storage apparatus comprising a drum rotatable about its axis, at least one row of peripherally spaced pins on said drum, each pin being radially movable between first and second data storing positions, each row of pins comprising a plurality of phases of pins, each phase comprising a plurality of pins spaced by equal angles about the periphery of the drum, the pins of each phase being spaced from the corresponding pins of each phase by relatively equal angles smaller than the angle between two pins of the same phase, means for rotating said drum, stationary means adjacent a locality in the path through which the pins move as the drum rotates, said stationary means including means adapted when electrically energized to shift the passing pins between said first and second positions, means operating synchronously with said drum rotating means and operable to energize said pin shifting means only at predetermined angular positions of said drum, said predetermined angular positions being spaced apart by angles equal to the angles between the pins of one phase, so that said pin shifting means cooperates with the pins of only one phase, a record card punched in a first locality to indicate a phase of the drum and in a second locality to indicate data to be stored on the indicated phase of the drum, card reading mechanism including a first reading station to read said first locality and a second reading station to read said second locality, card feeding mechanism for driving said card through successive first and second card feeding cycles in each of which it passes a respective one of said reading stations, means at the first reading station effective to read and store the phase indication from the card during a predetermined fraction of said first cycle, means effective during the remainder of the first cycle to shift the angular position of the drum relative to the drum rotating means to bring the phase indicated by the card into cooperative relation with the pin shifting means, and means at the second reading station and effective during said predetermined fraction of the second cycle to read the data on the card and to control said pin shifting means to store the data on the drum.

18. Data storage apparatus as defined in claim 17, comprising a plurality of rows of pins on the drum, said rows of pins being divided into sections, each section comprising at least one row, separate pin shifting means for each section, said record card having a section selecting punch, means effective during said first reading cycle to read and store the section selection indicated by the punch on the card, and means effective during the second reading cycle to place the card reading mechanism at the second station in control of the pin shifting means for the selected section.

19. Data storage apparatus comprising a drum rotatable about its axis, at least one row of peripherally spaced pins on said drum, each pin being radially movable between first and second data storing positions, each row of pins comprising a plurality of phases of pins, each phase comprising a plurality of pins spaced by equal angles about the periphery of the drum, the pins of each phase being spaced from the corresponding pins of each other phase by respectively equal angles smaller than the angle between two pins of the same phase, means for rotating said drum, stationary means adjacent a locality in the path through which the pins move as the drum rotates, said stationary means including pin position sensing means adapted to cooperate with the passing pins to produce successive timed signals indicative of the positions of the successive pins; commutator means operating synchronously with said drum rotating means, data exhibiting means, and means including said pin position sensing means and said commutator means to energize said data exhibiting means only at predetermined angular positions of said drum, said predetermined angular positions being spaced apart by angles equal to the angles between the pins of one phase, so that said data exhibiting means may be actuated at any given time by the pins of only one phase.

20. Data storage apparatus comprising a drum rotatable about its axis, at least one row including five peripherally spaced pins on the drum, each pin being radially movable between first and second data storing positions, said row of pins being settable to store one of a decimal series of digits selectively in accordance with a bi-quinary code in which each pin represents a selected digit from one to five and digits greater than five are represented by the five pin and another pin in combination, means for rotating said drum, stationary means adjacent a locality in the path through which the pins move as the drum rotates, said stationary means including cooperating data transfer means adapted when a pin in one of its two positions passes to produce an electrical signal indicating the pin position, a record, means for marking the record comprising decimal digit selecting means movable cyclically through a series of ten digit selecting positions, beginning with the highest number, means driving said digit selecting means synchronously with the drum through a recording cycle in which the drum rotates twice and the pins pass the data transfer means twice while the digit selecting means runs through said series of positions once, the five pin being the first pin to pass the data transfer means in said cycle, means for sensing the position of the five pin in the first drum rotation, means effective when a five pin is sensed in its digit storing position in said first drum rotation to control the digit selecting means in accordance with the pin positions during the succeeding drum rotation, thereby recording a digit greater than four, and effective when no five pin is sensed in its digit storing position during said first drum rotation to control the digit selecting means in accordance with the pin positions during the second drum rotation only of the recording cycle, thereby recording a digit less than five.

21. Data storage apparatus comprising a drum rotatable about its axis, at least one row including five peripherally spaced pins on said drum, each pin being radially movable between first and second data storing positions, means for rotating said drum, stationary means adjacent a locality in the path through which the pins move as the drum rotates, said stationary means including cooperating data transfer means adapted when electrically energized to shift the passing pins to store digits on said drum, a record comprising a series of ten successively numbered localities adapted for selective marking to indicate a selected decimal digit in one numerical order, means operating synchronously with the drum driving means to scan said localities successively once, beginning with the highest number, as said drum rotates twice and said five pins pass the data transfer means twice, means effective when a marked digit is scanned to energize the data transfer means and thereby shift the pin then passing between its two positions, and means effective when a digit is scanned in any locality numbered greater than five to energize the data transfer means when the "five" pin next passes, thereby storing decimal quantities in the five pins according to a bi-quinary code.

22. Data storage apparatus comprising a drum rotatable about its axis, a plurality of data storage fields on said drum, each field comprising at least one row of peripherally spaced pins on the drum, each pin being radially movable between first and second data storing positions, means for rotating the drum, stationary means adjacent a locality in the paths through which the pins move as the drum rotates, said stationary means comprising, for each row of pins, data transfer means including pin position sensing means and pin positioning means, and means operable to place the pin positioning means of one storage field under the control of the pin position sensing means of another storage field, so as to transfer data from said other field to said one field.

23. Error signal apparatus comprising a signal, an element movable between a normal position and an active position, means for moving said element in response to a control impulse, control means for said moving means including means to initiate a control impulse, means, including time delay means, responsive to said control impulse and effective to actuate said error signal a predetermined time after said impulse, and means responsive to the movement of said element during said predetermined time to block actuation of said error signal by said impulse responsive means.

24. An accounting machine comprising an index member rotatable repeatedly through a predetermined cycle, data storage means including a drum rotating at a speed which is a whole multiple of the speed of the index member, means for feeding punched cards to said machine, means for reading the cards during a first fraction of each cycle of the index member, and means for shifting the phase of the rotating drum with respect to the index member during a later fraction of each cycle of the index member.

25. An accounting machine comprising an index member rotatable repeatedly through a predetermined cycle, data storage means including a drum having magnetic storage elements thereon and rotating synchronously with said index member, means for feeding punched card records successively to said machine, means for reading the punched card records successively during successive cyles of the index member for entering data on said storage elements, and means controlled by the record reading means and operable during each cycle for magnetically and selectively sensing said data entered on the drum.

26. An accounting machine as defined in claim 25, including means controlled by the record reading means for selectively resetting the storage elements on the drum.

27. Phase shifting apparatus, comprising a continuously rotating index member, a rotatable member, means operable to connect said rotatable member to said index member for continuous rotation therewith and at a speed having a fixed ratio to the index member speed in any one of a plurality of phase relationships, means for selecting a desired phase from said plurality of phase relationships, means operable to drive said rotatable member at a speed different from said fixed ratio speed to vary its phase with respect to the index member, means for checking the correspondence of the phase of the rotatable member with the selected phase, means controlled by said selecting means and said checking means to initiate operation of said drive means only when the existing phase differs from the selected phase, and means effective when the rotatable member reaches the selected phase to terminate operation of the drive means.

28. A data storage device, comprising a pin shiftable longitudinally between first and second data storage positions, mechanical means operable to engage and move the pin between said positions, said pin being at least in part of magnetic material, electromagnetic means for sensing the pin position, means to control said mechanical means to set said pin selectively in one of said positions, position checking means including said sensing means, an error signal, and means including said control means and said checking means to actuate the error signal if the pin position does not correspond to the position selected by the control means.

References Cited in the file of this patent

UNITED STATES PATENTS

| | | |
|---|---|---|
| 1,292,537 | Thieme | Jan. 28, 1919 |
| 1,531,041 | Stinson | Mar. 24, 1925 |
| 2,030,027 | Greenwood | Feb. 4, 1936 |
| 2,208,164 | Sageman | July 16, 1940 |
| 2,263,985 | Finch | Nov. 25, 1941 |
| 2,340,772 | Rubidge et al. | Feb. 1, 1944 |
| 2,369,430 | Brand et al. | Feb. 13, 1945 |
| 2,385,918 | Heberlein | Oct. 2, 1945 |
| 2,399,755 | Mills et al. | May 7, 1946 |
| 2,521,338 | Bryce et al. | Sept. 5, 1950 |
| 2,573,561 | Furman | Oct. 30, 1951 |
| 2,702,380 | Brustman et al. | Feb. 15, 1955 |
| 2,706,079 | Connolly | Apr. 12, 1955 |
| 2,721,990 | McNaney | Oct. 25, 1955 |
| 2,727,091 | Zenner | Dec. 13, 1955 |

FOREIGN PATENTS

| | | |
|---|---|---|
| 1,013,988 | France | Aug. 6, 1952 |
| 480,135 | Great Britain | Feb. 17, 1938 |

UNITED STATES PATENT OFFICE

CERTIFICATE OF CORRECTION

Patent No. 2,935,251 May 3, 1960

Arthur H. Dickinson

It is hereby certified that error appears in the printed specification of the above numbered patent requiring correction and that the said Letters Patent should read as corrected below.

Column 14, line 29, after "reset" insert -- relay --; line 39, for "inner of" read -- inner or --; column 15, line 60, for "cut if" read -- cut it --; column 16, line 14, for "one" read -- once --; column 17, lines 4 and 7, for "Thydratron", each occurrence, read -- Thyratron --; line 70, for "from the" read -- from its --.

Signed and sealed this 1st day of November 1960.

(SEAL)

Attest:

KARL H. AXLINE
Attesting Officer

ROBERT C. WATSON
Commissioner of Patents